United States Patent
Guy et al.

(10) Patent No.: US 12,088,597 B2
(45) Date of Patent: *Sep. 10, 2024

(54) METHOD FOR VERIFYING SECURITY TECHNOLOGY DEPLOYMENT EFFICACY ACROSS A COMPUTER NETWORK

(71) Applicant: Sevco Security, Inc., Austin, TX (US)

(72) Inventors: Jeffrey J. Guy, Austin, TX (US); Greg Fitzgerald, Austin, TX (US); Jeremiah Clark, Austin, TX (US); Dean Mekkawy, Austin, TX (US); Nevins Bartolomeo, Austin, TX (US); Jim LoRusso, Austin, TX (US); Nick Murdock, Austin, TX (US); Allen Saunders, Austin, TX (US); Jacob Hackett, Austin, TX (US)

(73) Assignee: Sevco Security, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,575

(22) Filed: Mar. 31, 2023

(65) Prior Publication Data

US 2023/0308452 A1    Sep. 28, 2023

Related U.S. Application Data

(63) Continuation of application No. 17/720,163, filed on Apr. 13, 2022, now Pat. No. 11,647,027.

(Continued)

(51) Int. Cl.
*H04L 9/40* (2022.01)
*G06F 9/455* (2018.01)
(Continued)

(52) U.S. Cl.
CPC ........ *H04L 63/104* (2013.01); *G06F 9/45558* (2013.01); *H04L 41/0893* (2013.01);
(Continued)

(58) Field of Classification Search
CPC ... H04L 63/104; H04L 41/0893; H04L 41/12; H04L 63/102; G06F 9/45558
See application file for complete search history.

(56) References Cited

U.S. PATENT DOCUMENTS 11,647,027 B2 * 5/2023 Guy .................... G06F 9/45558
726/1

* cited by examiner

*Primary Examiner* — Oleg Korsak
(74) *Attorney, Agent, or Firm* — Run8 Patent Group, LLC; Peter Miller; Brian T. Chew

(57) ABSTRACT

A method for monitoring endpoint devices affiliated with a computer network includes: for each security technology, accessing a set of objects generated by the security technology during a time interval and representing characteristics endpoint devices configured with the security technology, partitioning object groups representing individual endpoint devices, and aggregating characteristics represented in each object group into an endpoint device container associated with the security technology and containing identifying data and status data representing one endpoint device; identifying a first subset of endpoint devices configured with first and second security technologies based on correspondence between data contained endpoint device containers associated with the first and second security technologies; and identifying a second subset of endpoint devices configured with the first security technology and excluding the second security technology based on absence of correspondence between data contained in endpoint device containers associated with the first and second security technologies.

20 Claims, 7 Drawing Sheets

Related U.S. Application Data

(60) Provisional application No. 63/281,980, filed on Nov. 22, 2021, provisional application No. 63/174,485, filed on Apr. 13, 2021.

(51) Int. Cl.
*H04L 41/0893* (2022.01)
*H04L 41/12* (2022.01)

(52) U.S. Cl.
CPC ............ H04L 41/12 (2013.01); H04L 63/102 (2013.01); *G06F 2009/45587* (2013.01); *G06F 2009/45595* (2013.01)

METHOD FOR VERIFYING SECURITY TECHNOLOGY DEPLOYMENT EFFICACY ACROSS A COMPUTER NETWORK

CROSS-REFERENCE TO RELATED APPLICATIONS

This Application is a continuation of U.S. patent application Ser. No. 17/720,163, filed on 13 Apr. 2022, which claims the benefit of U.S. Provisional Application No. 63/174,485, filed on 13 Apr. 2021, and 63/281,980, filed on 22 Nov. 2021, each of which is incorporated in its entirety by this reference.

TECHNICAL FIELD

This invention relates generally to the field of Internet security and more specifically to a new and useful method for verifying security technology deployment efficacy across a computer network in the field of internet security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
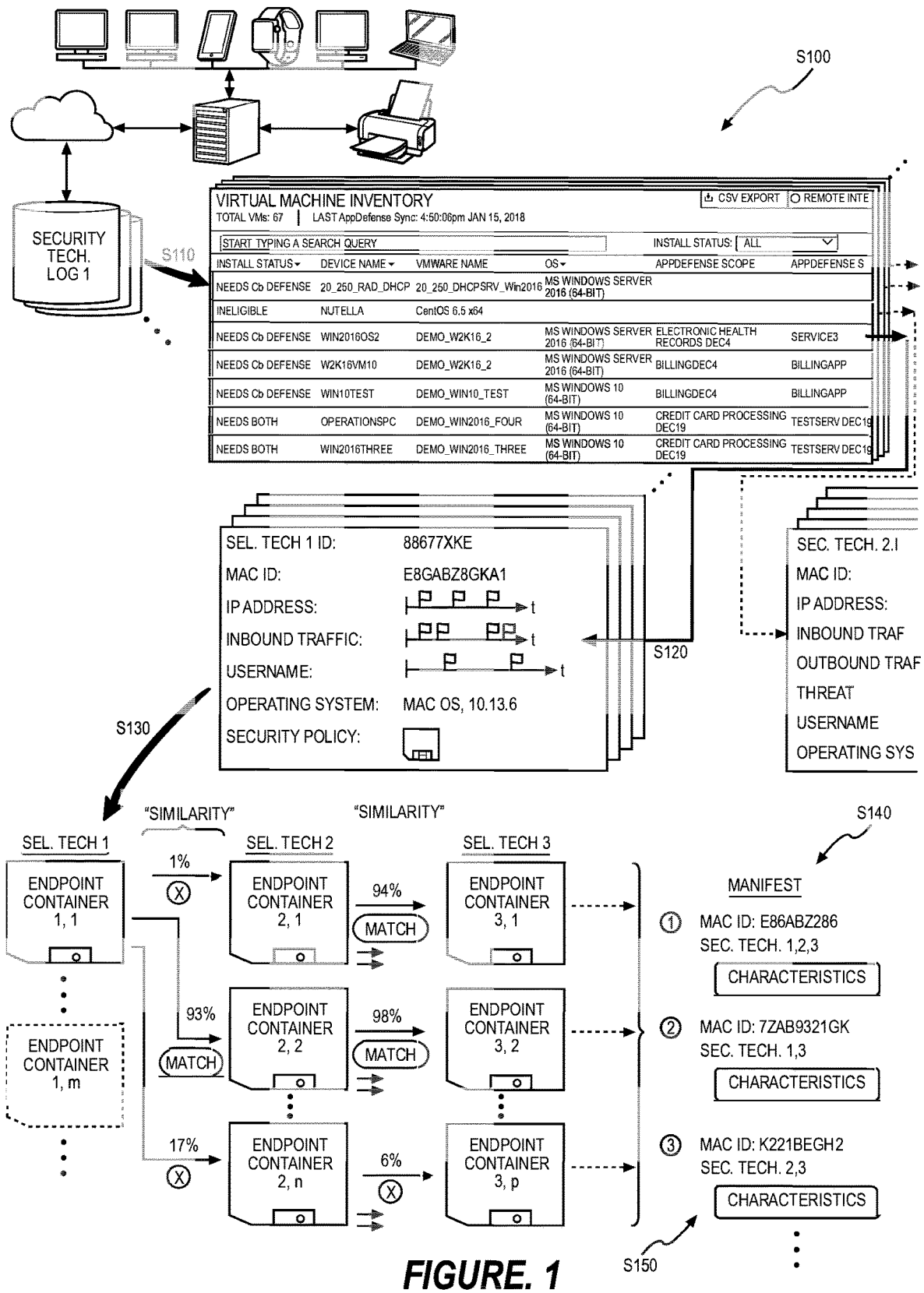
FIG. 1 is a flowchart representation of a method.
Figure 2:
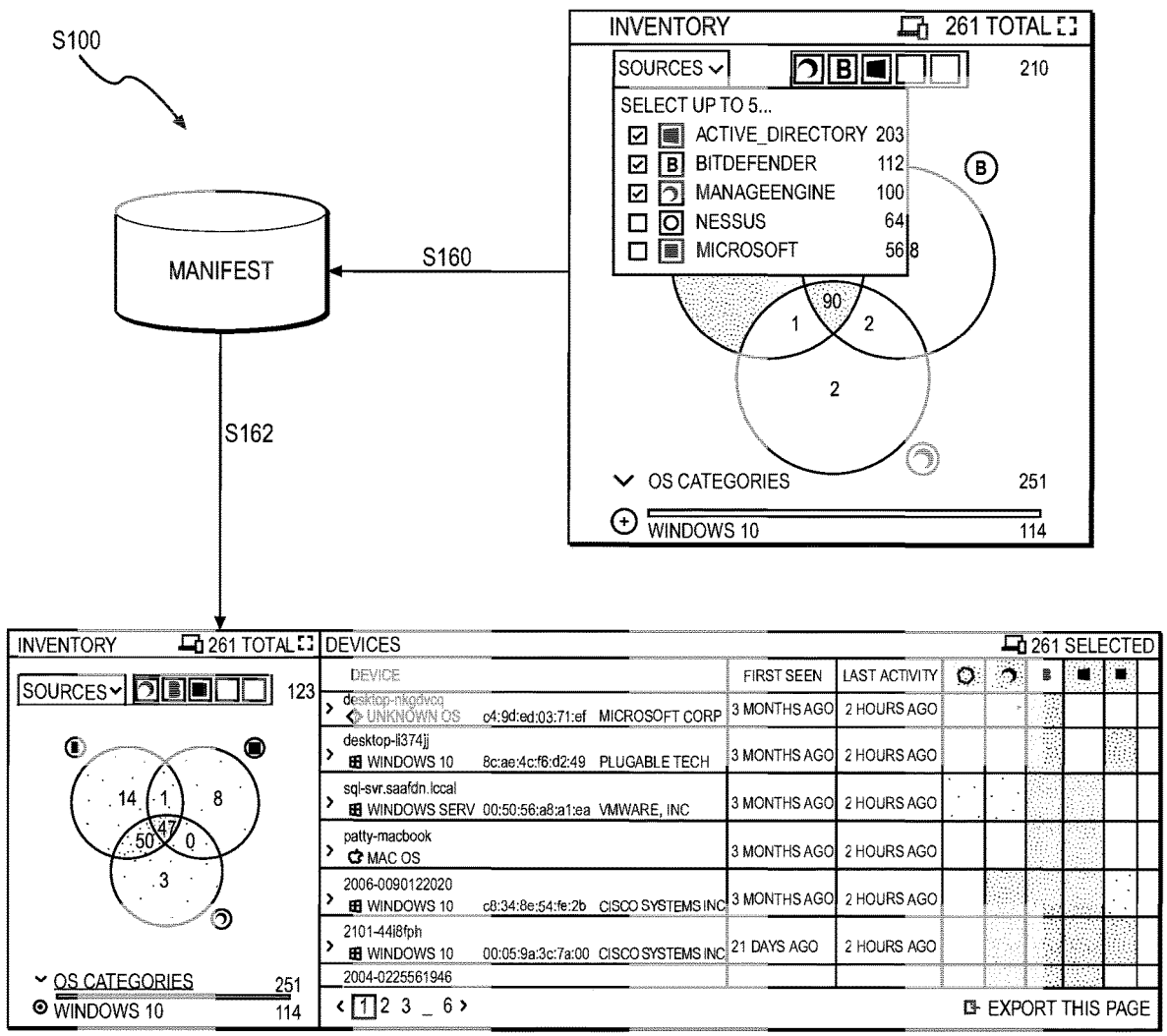
FIG. 2 is a flowchart representation of one variation of the method.
Figure 3:
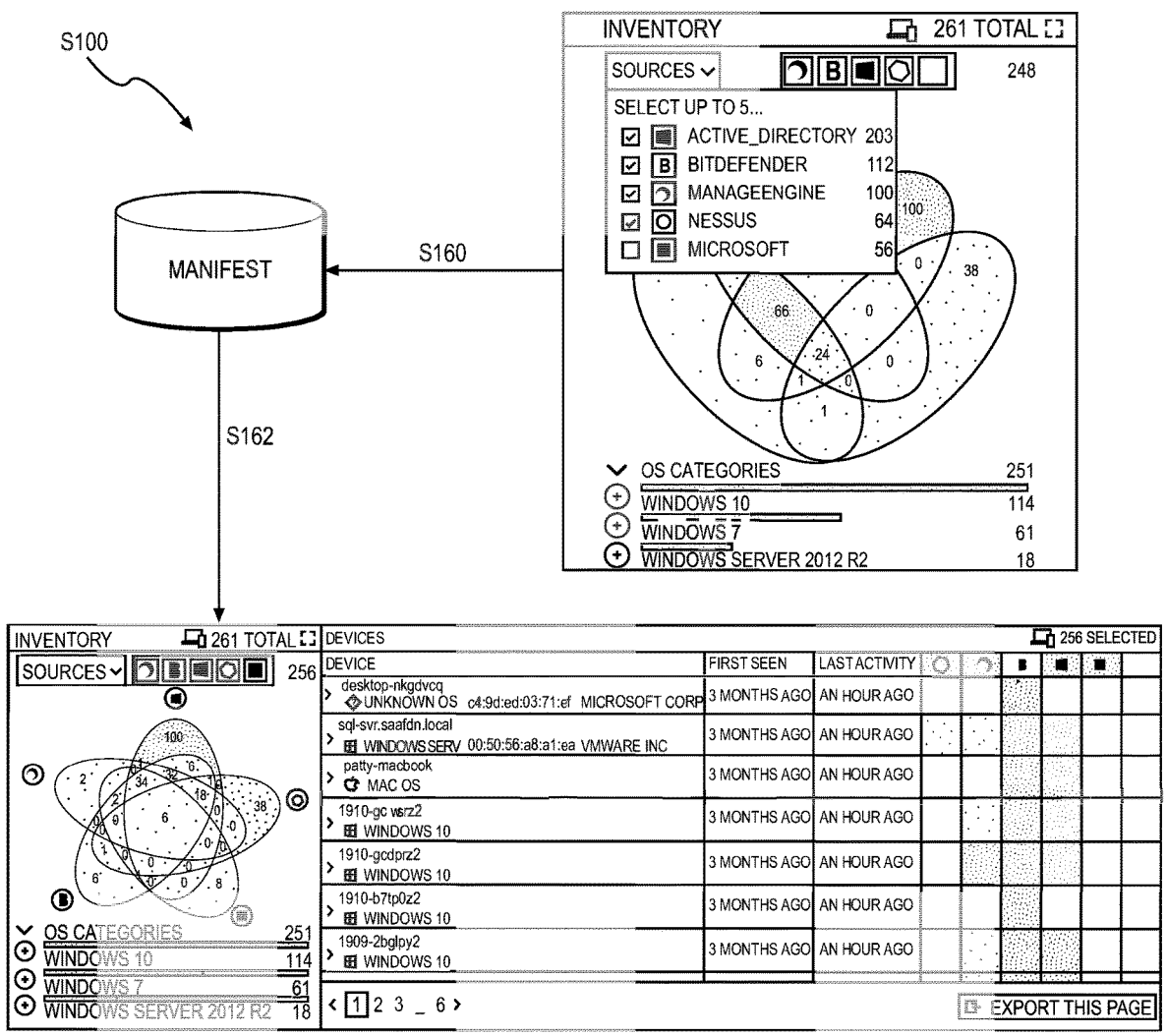
FIG. 3 is a flowchart representation of one variation of the method.

As shown in FIGS. 1-3, a method S100 for verifying security technology deployment efficacy across a computer network includes accessing a set of objects published by a set of security technologies designated for deployment on a computer network in Block S110. The method S100 also includes, for each set of objects published by a security technology in the set of security technologies: partitioning the set of objects into a set of object groups, each object group in the set of object groups including a sequence of objects published by the security technology and representing one endpoint device, in a set of endpoint devices, connected to the computer network during a target time interval in Block S120; and, for each object group in the set of object groups, aggregating objects in the object group into an endpoint device container (or virtual container, or "source") including fixed identifying data and variable status (e.g., device and security technology configuration) data representative of one endpoint device in the set of endpoint devices in Block S130, the endpoint device container stored in a set of endpoint device containers associated with the security technology. The method S100 further includes, based on fixed identifying data and variable status data contained in endpoint device containers in the set of endpoint device containers associated with the set of security technologies: generating a manifest (or "aggregation") of endpoint devices connected to the computer network during the target time interval in Block S140; and labeling each endpoint device in the manifest of endpoint devices with a combination of security technologies, in the set of security technologies, deployed on the set of endpoint devices during the target time interval in Block S150. The method S100 also includes, at an operator portal: receiving selection of a subset of security technologies, in the set of security technologies in Block S160; and rendering a visualization depicting quantities of endpoint devices labeled with permutations of the subset of security technologies in the manifest in Block S162.

A similar variation of the method S100 includes accessing a set of event logs published by a set of security technologies designated for deployment on a computer network in Block S110. This variation of the method S100 also includes, for each event log in the set of event logs: partitioning events in the event log into a set of groups of events, each group of events in the set of groups of events including a sequence of events recorded by a security technology, in the set of security technologies, and representing one endpoint device, in a set of endpoint devices, connected to the computer network during a first time interval in Block S120; and, for each group of events in the set of groups of events, aggregating events in the group of events into an endpoint device container including fixed identifying data and event-based identifying data representative of one endpoint device in the set of endpoint devices in Block S130, the endpoint device container stored in a set of endpoint device containers associated with the security technology. This variation of the method S100 further includes, based on identifying data and event-based identifying data contained in endpoint device containers in the set of endpoint device containers associated with the set of security technologies: generating a manifest of endpoint devices connected to the computer network during the first time interval in Block S140; and labeling each endpoint device in the manifest of endpoint devices with a combination of security technologies, in the set of security technologies, deployed on the set of endpoint devices during the first time interval in Block S150. This variation of the method S100 also includes, at an operator portal: receiving selection of a subset of security technologies, in the set of security technologies in Block S160; and rendering a visualization depicting quantities of endpoint devices labeled with permutations of the subset of security technologies in the manifest in Block S162.

Another variation of the method S100 shown in FIGS. 4A, 4B, 4C, and 4D includes generating a set of endpoint device containers by, for each security technology in the set of security technologies: accessing a set of objects generated by the security technology during a first time interval and representing characteristics of a subset of endpoint devices, in the set of endpoint devices, configured with the security technology; partitioning the set of objects into a set of object groups in Block S120, each object group in the set of object groups representing a sequence of statuses of an endpoint device, in the subset of endpoint devices, during the first time interval; and, for each object group in the set of object groups, aggregating characteristics represented in objects in the object group into an endpoint device container, in the set of endpoint device containers, associated with the security technology and including fixed identifying data and variable status data representing an endpoint device in the subset of endpoint devices in Block S130. This variation of the method S100 also includes: identifying a first subset of endpoint devices, in the set of endpoint devices, configured with a first security technology and a second security technology in the set of security technologies in Block S140 based on correspondence between fixed identifying data and variable status data contained in a first subset of endpoint device containers associated with the first security technology and the second security technology; and identifying a second subset of endpoint devices, in the set of endpoint devices, configured with the first security technology and excluding the second security technology in Block S140 based on absence of correspondence between fixed identifying data and variable status data contained in a second subset of endpoint device containers associated with the first security technology and the second security technology. This variation of the method S100 further includes, in response to selection of the first security technology and the second security technology, generating a visualization representing: the first subset of endpoint devices configured with the first security technology and the second security technology; and the second subset of endpoint devices configured with the first security technology and excluding the second security technology in Block S162.

A similar variation of the method S100 shown in FIGS. 4A, 4B, 4C, and 4D includes generating a set of endpoint device containers by, for each security technology in the set of security technologies: accessing a set of objects generated by the security technology during a time interval and representing characteristics of a subset of endpoint devices, in the set of endpoint devices, configured with the security technology; partitioning the set of objects into a set of object groups in Block S120, each object group in the set of object groups representing a particular endpoint device in the subset of endpoint devices; and, for each object group in the set of object groups, aggregating characteristics represented in the object group into an endpoint device container, in the set of endpoint device containers, associated with the security technology and including identifying data and status data representing a particular endpoint device in the subset of endpoint devices in Block S130. This variation of the method S100 also includes: identifying a first subset of endpoint devices, in the set of endpoint devices, configured with a first security technology and a second security technology in the set of security technologies in Block S140 based on correspondence between identifying data and status data contained in a first subset of endpoint device containers associated with the first security technology and the second security technology; identifying a second subset of endpoint devices, in the set of endpoint devices, configured with the first security technology and excluding the second security technology in Block S140 based on absence of correspondence between identifying data and status data contained in a second subset of endpoint device containers associated with the first security technology and the second security technology; accessing a security policy for the computer network in Block S170; and, in response to the security policy specifying deployment of the first security technology and the second security technology, generating a prompt to selectively investigate endpoint devices, in the second subset of endpoint devices, for absence of the second security technology in Block S172.

2. Applications

Generally, a computer system (e.g., a local or remote computer system connected to or interfacing with a computer network) can execute Blocks of the method S100: to retrieve a set of objects (and/or registration logs, etc.) published by a set of security technologies designated for deployment on the computer network; to identify device correspondence between objects (e.g., based on fixed device identifiers and/or object times and); to fuse this device correspondence into a manifest containing one identifier for each endpoint device represented in at least one log in this set of logs; and to label each device in the manifest with each security technology—in the set of security technologies—that published at least one object corresponding to the device.

More specifically, the computer system can execute Blocks of the method S100: to compile disparate logs and/or objects—published by various security technologies deployed on devices connected to the network—into one manifest that identifies all unique devices connected to the computer network during a target time interval (e.g., a past hour); and to label each unique device described in the manifest containing an accurate combination of security technologies executing on the device during the target time interval.

Additionally or alternatively, the computer system can execute Blocks of the method S100: to compile disparate logs and/or object—published by various productivity tools and/or other non-security technologies deployed on devices connected to the network—into the manifest; and to further label each unique device described in the manifest containing an accurate combination of productivity tool and/or non-security technologies executing on the device during the target time interval.

Additionally or alternatively, the computer system can: poll security technologies, productivity tools, other non-security technologies, and/or network devices directly for objects that contain endpoint device identifying and configuration data, such as hourly, daily, or when triggered by security personnel; and then execute Blocks of the method S100 to fuse these identifying and configuration data into a manifest containing an accurate combination of all endpoint devices connected to the computer system and their configurations during a current time interval.

An operator portal (e.g., executing on a local device) can then execute Blocks of the method S100 to: render a user interface; publish a menu identifying the set of security technologies; and receive selection of a subset of security technologies from an operator (e.g., a security analyst, a network administrator). The operator portal (or the computer system) can then query the manifest for quantities of devices labeled with each permutation of the subset of (e.g., one, three, five) security technologies selected by the operator, such as: quantities of unique devices labeled with a single security technology in the subset of security technologies; quantities of unique devices labeled with only two security technologies in the subset of security technologies; quantities of unique devices labeled with only three security technologies in the subset of security technologies; etc. The operator portal can then populate regions of a Venn diagram (or other visualization) with these quantities, thereby enabling the operator to quickly visualize: a total quantity of unique devices connected to the computer network during the target time interval; quantities of these devices on which each permutation of the subset of security technologies are deployed and active during the target time interval; and quantities and identifiers of devices failing to fulfill a security policy (e.g., specifying deployment of all security technologies in the subset selected by the operator).

Furthermore, the organization may have an interest in understanding its inventory of assets for other business reasons, including the operation of ancillary network-based services such as: configuration management database (CMDB) services; security information and event management (SIEM) services and investigations; vulnerability management services; professional services automation (PSA) for managed security service provider (MSSP) services; and/or accounting and financial management best practices and compliance (e.g., compliance with GAAP accounting principles for asset depreciation). Therefore, the computer system can execute Blocks of the method S100 to: detect all endpoint devices connected to the computer network, such as within a target time interval; detect security technology (and productivity tool, etc.) configurations of these endpoint devices; compile these data into a manifest representing a comprehensive inventory of endpoint devices connected to the computer network during the target time interval; and translate the manifest into various formats that target such interests of the organization.

2.1 Terms

The computer system and the operator portal are described herein as executing Blocks of the method S100 to characterize and visualize (real-time, historical) security technology deployment efficacy across devices connected to the computer network based on logs published by these security technologies. Additionally or alternatively, the computer system and/or the operator portal can execute Blocks of the method S100 to: call application programming interfaces (or "APIs") hosted by these security technologies (or "sources") for objects detected by these security technologies; fuse objects returned by these security technologies; and then characterize and visualize security technology deployment efficacy across devices connected to the computer network accordingly.

Furthermore, the computer system and the operator portal can execute Blocks of the method S100 to characterize and visualize security technology deployment efficacy across all computing resources owned by an organization (e.g., laptop computers and printers own by the organization and provided to employees) or computing devices accessing resources supplied by the organization (e.g., personal smartphones accessing virtual drives or email accounts owned by the organization; personal computing devices connecting to organization resources through VPN). Similarly, the computer system and the operator portal can execute Blocks of the method S100 to characterize and visualize security technology deployment efficacy across all computing resources connected to a singular physical computer network or connected to accessing organization resources through any one or more affiliated or unaffiliated computer networks over time.

The computer system and the operator portal can additionally or alternatively execute Blocks of the method S100 to characterize and visualize deployment efficacy of a suite of technology types, such as traditional internet technology tools, authentication platforms, Cloud/SaaS applications, endpoint security technologies, firewalls, etc.

2.2 Example

For example, a security policy for the computer network can specify deployment of a first endpoint security technology and a second endpoint security technology (hereinafter "security technologies") on all endpoint devices connected to the computer network.

At a given time, the first security technology may be deployed on a first quantity of endpoint devices connected to the computer network, and an operator may interpret this first quantity of endpoint devices from objects published by the first security technology. Similarly, for this same time, the second security technology may be deployed on a second quantity of endpoint devices connected to the computer network, and the operator may interpret this second quantity of endpoint devices from objects published by the second security technology. The operator may assume that all endpoint devices connected to the network are properly configured with the first and second security technologies if the first and second quantities are identical. However, some endpoint devices in the first quantity may be configured with the first security technology only, and some endpoint devices in the second quantity may be configured with the second security technology only. Similarly, if the first and second quantities differ by a first difference, the operator may incorrectly assume that only this first difference of endpoint devices are incorrectly configured.

Furthermore, the operator may estimate a total quantity of endpoint devices connected to this computer network at this time based on the greater of the first and second quantities. However, the true quantity of endpoint devices connected to the computer network at this time may be (much) greater that the greater of the first and second quantities if each of the first and second security technologies are deployed on only subsets of the total quantity of endpoint devices connected to the network at this time.

Moreover, employees, personnel, guests, and other affiliates of the organization (hereinafter "users") may frequently: be hired and assigned new computing devices; be terminated; leave and return to the organization campus throughout their computing devices each day or over longer time periods with their endpoint devices; and/or connect organization-related and personnel devices to the computer network over time. Therefore, the total quantity of endpoint devices connected to the computer network may change frequently (e.g., per minute, hour, or day) and may differ (significantly) from the operator's last estimated total quantity of endpoint devices affiliated with the computer network.

Therefore, the computer system can execute Blocks of the method S100 to: identify a first set of endpoint devices connected to the computer network and on which the first security technology is deployed during a target time interval based on objects published by the first security technology during this target time interval; identify a second set of endpoint devices connected to the computer network and on which the second security technology is deployed during this target time interval based on objects published by the second security technology during this target time interval; identify an intersection and disjoints of these sets of endpoint devices based on similar and dissimilar identifiers and features contained in these objects; and then derive deployment efficacy metrics for the first and second security technologies based on the intersection and these disjoints, including accurate quantities of endpoint devices on which only one and both of the first and second security technologies are deployed. The operator portal can then present these deployment efficacy metrics for the first and second security technologies to the operator in a visualization (e.g., a Venn diagram) that enables the operator to quickly ascertain accurate quantities of endpoint devices that are and are not properly configured according to the security policy.

The computer system and the operator can also simultaneously execute the process to derive and visualize deployment efficacy metrics for (many) more security technologies designated by the security policy.

Furthermore, the computer system and the operator portal can execute Blocks of the method S100 to: generate a manifest of endpoint devices and they security technology configurations; ingest a security policy for the computer network; detect deviations from the security policy in configurations of a subset of these endpoint devices; and selectively prompt security personnel to investigate (e.g., reconfiguration, quarantine) this subset of endpoint devices.

3. Computer Network and Devices

Generally, various assets (or "devices") may connect to an organization's computer network over time, such as: network devices, including hubs, switches, routers, bridges, gateways, modems, repeaters, and/or access points; and endpoint devices (or "agents"), including workstations, laptops, smartphones, printers, mobile kiosks, smartwatches, and/or printers.

4. Organization and Security Policy

Generally, a security policy for the organization may specify deployment of a suite of security technologies on devices connected to the network, such as: network security technology (e.g., firewalls, sensors); and endpoint security technologies (e.g., anti-virus and anti-malware tools). For example, the security policy may specify a suite of endpoint security technologies for: all endpoint devices; a subset of endpoint devices executing a particular operating system; a subset of endpoint devices of a particular type (e.g., printer, workstation, smartphone); and a subset of endpoint devices operated by a particular set of users or user class.

Furthermore, the security policy may specify that certain configurations or capabilities of an endpoint device (e.g., wireless communications) be deactivated during certain times or when the endpoint device is otherwise connected to the computer network (e.g., through a wired port). Similarly, the security policy may specify that a suite of network security technologies be deployed and active on the computer network via network devices.

Additionally or alternatively, the security policy may specify that installation or operation of certain productivity tools (e.g., a word processor, a desktop email client) onto an endpoint device be paired with a particular security technology and/or a particular security technology configuration.

5. Security Technologies and Objects

Block S110 of the method S100 recites accessing a set of objects published by a set of security technologies designated for deployment on a computer network. Block S120 of the method S100 recites partitioning the set of objects into a set of object groups, each object group in the set of object groups including a sequence of objects recorded by a security technology, in the set of security technologies, involving one endpoint device, in a set of endpoint devices, connected to the computer network during a target time interval.

Figure 4A:
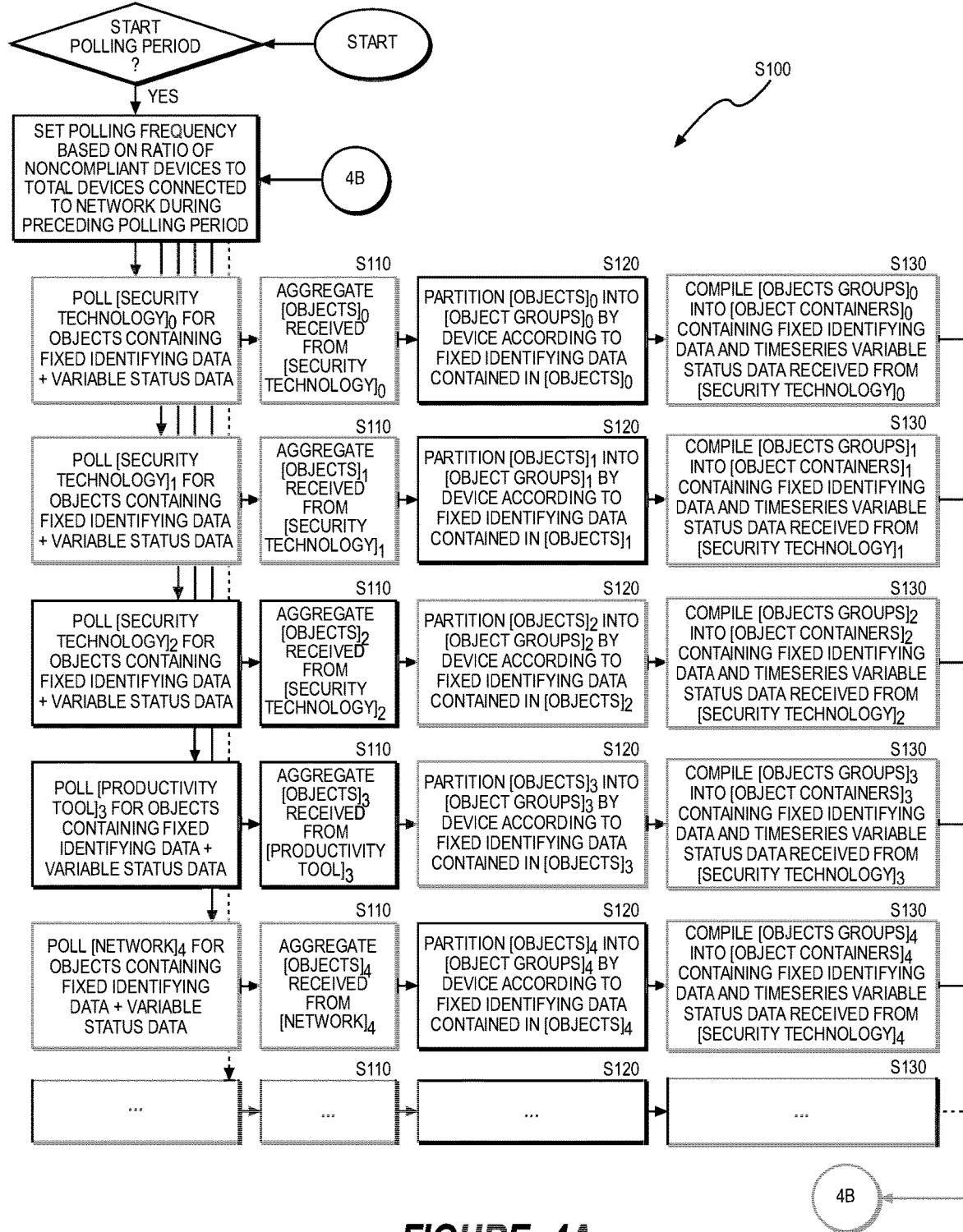
FIGS. 4A, 4B, 4C, and 4D are a flowchart representation of one variation of the method.

As shown in FIGS. 1 and 4A, each endpoint security technology and/or network technology may publish device and network objects for each device on which the security technology is deployed and active, such as: automatically on a regular interval; when endpoint devices connect to and disconnect from the network; and/or when called by the computer system (e.g., via API). For example, when deployed on endpoint devices connected to the computer network, an endpoint security technology can populate registration objects, each containing: a device name internal to the security technology; a MAC address of the endpoint device; a current IP address of the endpoint device; a username or user identifier of a user logged into the endpoint device; an operating system of the endpoint device; a security policy configuration of the security technology at the endpoint device; a registration time of the security technology at the endpoint device; and/or a registration removal time of the security technology at the endpoint device; etc.

In another example, a security technology can generate these objects, and the computer system can call these objects via an application programming interface (API). Accordingly, the computer system can: ingest objects containing log events streamed by a first security technology—deployment on the computer network—for endpoint devices configured with the first security technology during a current time interval in Block S110; and repeat this process to aggregate objects from logs published by each other security technology deployed on the network during the current time interval. Then, in response to conclusion of the current time interval, the computer system can execute subsequent Blocks of the method S100 to identify subsets of endpoint devices that exhibit identical security technology configurations during this time interval based on objects collected from logs published by these security technologies during this time interval.

Additionally or alternatively, the endpoint security technology can populate an object log with log objects, each log object containing: a device name internal to the security technology; a MAC address of the endpoint device; a current IP address of the endpoint device; a username or user identifier of a user logged into the endpoint device; an operating system of the endpoint device; a time that the endpoint device connected to or disconnected from the computer network; an inbound packet size and sender identifier; an outbound packet size and recipient identifier; a packet communication protocol; and/or a timestamp; etc. Accordingly, the computer system can: access one or more logs published by each endpoint security technology designated in the security policy in Block S110; and extract a target set of objects published or containing timestamps within a target time interval—described below—from each of these logs in Block S120.

5.1 Direct Device Polling

In one variation, the computer system periodically directly polls a set of devices connected to the computer network for objects representing status of these devices.

Generally, a device connected to the computer network—or a security technology installed on the device—may generate or publish device and network objects (e.g., device and network logs) unique to the device. For example, when a device connects to the computer network, an endpoint security technology deployed on the device may generate registration objects for the device, such as including: a fully-qualified domain name (FQDN); an international mobile equipment identity (IMEI) designation; a universal unique identifier (UUID) associated with the device; a device name internal to the endpoint device security technology; a MAC address of the endpoint device; a current IP address of the endpoint device; a username or user identifier of a user logged into the endpoint device; an operating system of the endpoint device including operating system version and/or patch level; a security policy configuration of the security technology at the endpoint device; a registration time of the security technology at the endpoint device; and/or a registration removal time of the security technology at the endpoint device.

The device can then store these registration objects in local memory. Accordingly, the computer system can directly poll these registration objects from the device.

5.2 Security Technology Polling via API

Alternatively, the computer system can call security technologies—operating on devices connected to the computer network—for objects via application programming interfaces (APIs), as shown in FIG. 4A. For example, an endpoint security technology may populate an object log with log objects, each containing: a device name internal to the security technology; a MAC address of the endpoint device; a current IP address of the endpoint device; a username or user identifier of a user logged into the endpoint device; an operating system of the endpoint device; a time that the endpoint device connected to or disconnected from the computer network; an inbound packet size and sender identifier; an outbound packet size and recipient identifier; a packet communication protocol; active or inactive ports, modems, or transceivers; a timestamp associated with the object log; a security protection/detection status; an agent version; and/or configuration.

5.3 Network Polling via API

In another implementation shown in FIG. 4A, the computer system implements direct network scanning via SMTP or DHCP protocols directed at the entire network.

In a similar implementation, the computer system implements network scanning protocols (SNMP) and/or a DHCP plug-in configured to infer attributes of the device and/or device network objects from DHCP server(s). For example, the computer system can execute these methods and techniques in place of or in addition to directly polling devices and/or polling security technologies deployed on these devices.

5.4 Object Variance

Therefore, the computer system can collect objects directly or indirectly from devices, security technologies, and/or the computer network, such as via API from object logs published by these entities.

However, content of these object logs and/or these objects may differ for different types of devices (e.g., network device or endpoint device), device usage, and/or applications deployed on these devices at time of polling. For example, content of the object log and associated log objects may vary by type of security technology reporting status on a particular device, such as based on depth and breadth of reporting ability of the security technology. In this example, a threat-specific endpoint security technology may report narrowly on its operational status at an endpoint device; and an endpoint security technology configured to detect a broad range of attack types may report on its operational status on an endpoint device and the operational status of the endpoint device more generally, such as whether the endpoint device has unattended ports or disabled encryption.

Therefore, the computer system can execute Blocks of the method S100 to reconcile identifying data contained in these objects collected from these disparate sources.

5.5 Polling Interval

Generally, the computer system can execute Blocks of the method S100 to periodically poll devices, security technologies, and/or the computer network over time, such as on a predefined time interval of once per hour or once per day.

Additionally or alternatively, the computer system can periodically poll subsets of devices and/or security technologies on the computer network at rolling intervals such that: the computer system collects objects substantially continuously throughout a polling interval; and each device and/or security technology responds to poll requests from the computer system only once per time interval.

In another implementation, the computer system polls security technologies substantially concurrently, such that objects published by different security technologies represent each device in the same configuration, of the same status, and of the same characteristics. More specifically, because the configuration, status, and characteristics of a device may change over time and because the computer system leverages common device configurations, statuses, and characteristics to reconcile objects from different security technologies, the computer system can poll objects from all security technologies on the computer network approximately concurrently in order to reduce opportunity for object configuration, status, and characteristics changes that may reduce correspondence between objects generated by different security technologies for the same device and thus introduce object reconciliation error.

Alternatively, the computer system: polls a first endpoint security technology across all endpoint devices on the network on a first time interval; polls a second endpoint security technology across all endpoint device on a second time interval, and polls a third endpoint security technology across all endpoint devices on a third time interval. In this implement, the first time interval, the second time interval, and the third time interval can overlap, but non-coincide, such that the computer system receives objects from these security technology substantially continuously.

6. Device Inventory Unification within Security Technologies

Figure 4B:
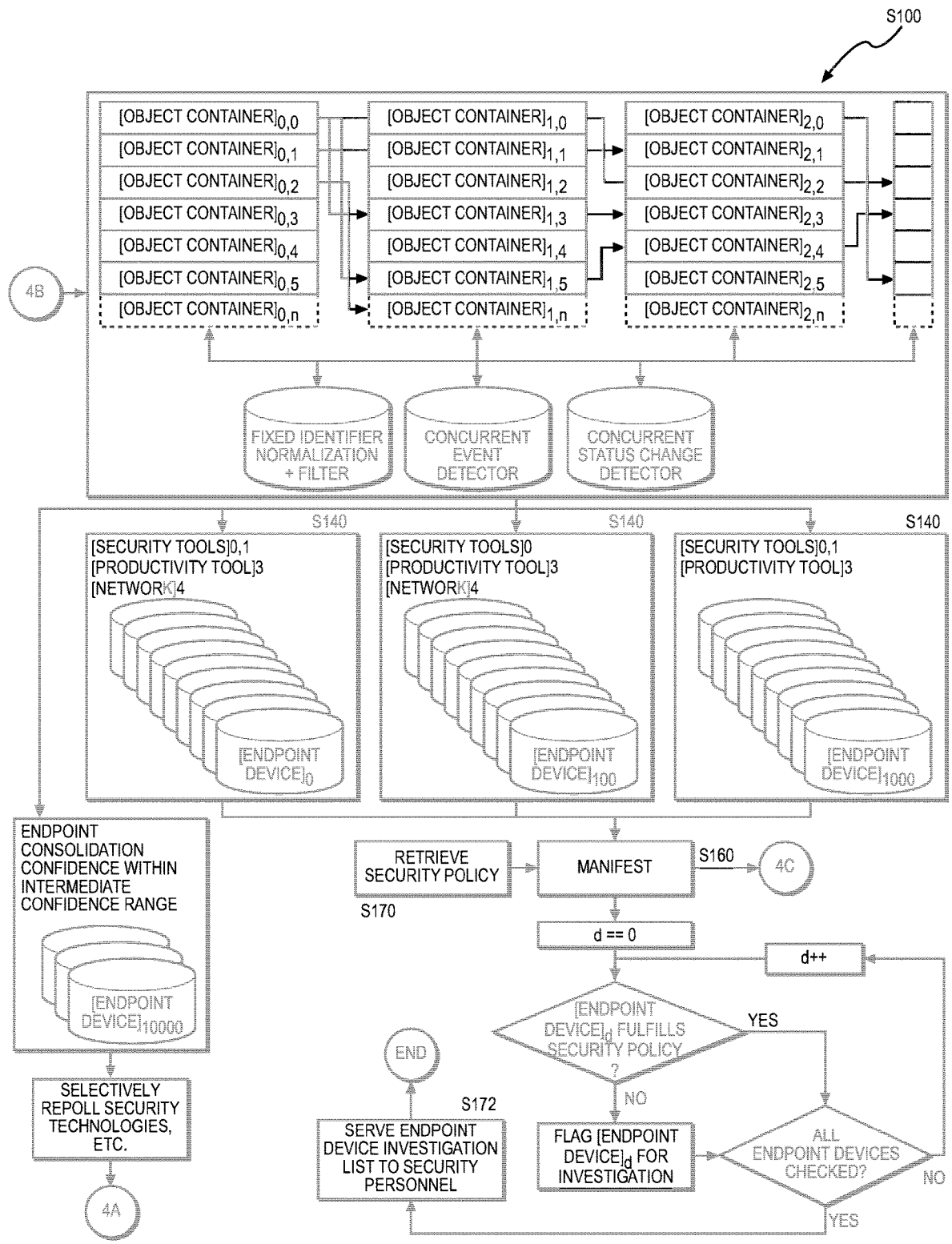

Block S130 of the method S100 recites, for each object group, aggregating objects in the object group into an endpoint device container (e.g., a "virtual container") including fixed identifying data and variable status data representative of one endpoint device in the set of endpoint devices in Block S130, the endpoint device container stored in a set of endpoint device containers associated with the security technology. Generally, in Block S130, the computer system can consolidate a target set of objects (or "events") for a security technology into object groups, wherein each object group corresponds to one endpoint device and contains one or more log objects involving the endpoint device and detected by the security technology during the target time interval, as shown in FIGS. 1 and 4B.

In one implementation, the computer system scans a first target set of objects—associated with a first security technology—for unique internal device identifiers assigned to endpoint devices by the first security technology. Then, for a first unique internal device identifier, the computer system can: isolate a object group containing this internal device identifier; extract fixed identifying data (e.g., MAC address, operating system) from this object group; and extract timeseries object-based identifying data from this object group. For example, the computer system can extract and aggregate timeseries object-based identifying data from this object group to generate: a first timeseries of IP addresses; a second timeseries of inbound data packets, including size and source IP address; a third timeseries of outbound data packets, including size and destination IP address; a fourth timeseries of login usernames; a fifth timeseries of network connection and disconnection instances by the endpoint device; a sixth timeseries of detected threats at the endpoint device; a seventh timeseries of security policy configurations at the endpoint device; etc. (Alternatively, the computer system can store extract single-point values in these domains from the object group.) The computer system can then compile these fixed and object-based data into one endpoint device container associated with the first unique internal device identifier.

The computer system can then repeat this process for each other unique internal device identifier represented in the first target set of objects published by the first security technology in order to generate a first set of endpoint device containers associated with the first security technology. Therefore, the computer system can consolidate the first target set of objects—published by the first security technology during the target time interval—into one representation of fixed and object-based device identifiers for each unique endpoint device on which the first security technology is installed.

The computer system can then repeat this process for each other security technology in order to generate a set of endpoint device containers associated with each security technology designated by the security policy.

Additionally or alternatively, rather than poll a security technology for log objects and then fuse these log objects into a group of unique objects in Block S130, the computer system can poll the security technology directly for this object group (e.g., via API call) and then aggregate these objects into an endpoint device container for the security technology. (The computer system can implement similar methods and techniques to generate or aggregate endpoint device containers for other technologies executing on or accessed by these endpoint devices, such as including authentication platforms, network tools, and/or Cloud/SaaS applications.)

7. Device Inventory Unification Across Security Technologies

Blocks S140 and S150 of the method S100 recite, based on fixed identifying data and variable status data contained in endpoint device containers in the set of endpoint device containers associated with the set of security technologies: generating a manifest (or "aggregation") of endpoint devices connected to the computer network during the target time interval; and labeling each endpoint device in the manifest of endpoint devices with a combination of security technologies, in the set of security technologies, deployed on the set of endpoint devices during the target time interval. Generally, in Block S140 and S150, the computer system can fuse endpoint device container—derived from isolated, internal logs published by disconnected security technologies—into one manifest identifying all unique endpoint devices connected to the computer network during the target time interval and the particular combinations of security technologies that detected each unique endpoint device during the target time interval, as shown in FIG. 4B.

7.1 Unification by Similarity Score

In one implementation shown in FIG. 1, the computer system: calculates similarities between endpoint device containers across all security technologies designated in the security policy; and identifies groups of endpoint device containers that correspond to the same endpoint devices based on fixed and object-based features stored in these endpoint device containers.

In particular, in this implementation, the computer system: select a first endpoint device container associated with a first security technology; select a second endpoint device container associated with a second security technology; extract a first set of values in a first domain (e.g., MAC addresses) from the first and second endpoint device containers; calculate a similarity score between this first set of values in the first domain (e.g., 1.0 if these MAC addresses are identical; 0.5 if these MAC addresses are different but similar; 0.01 if these MAC addresses are very dissimilar); extract a second set of values in a second domain (e.g., inbound data packets) from the first and second endpoint device containers; calculate a similarity score between this second set of values in the second domain (e.g., 1.0 if these values indicate receipt of data packets at the same ports, of very similar sizes, and at very similar times; 0.01 in the inbound data packet domain if the first and second endpoint device containers indicate receipt of data packets at different ports, of different sizes, and at different times); and repeat this process for each other domain represented in both the first and second endpoint device containers.

The computer system can then compile these similarity scores into one composite similarity score representing similarity between the first and second endpoint device containers across all domains represented in both the first and second endpoint device containers. For example, when compiling these similarity scores, the computer system can implement different weights for each domain, such as: a weight of 1.0 for MAC address similarity scores; a weight of 0.9 for operating system similarity scores; a weight of 0.8 for concurrent IP address similarity scores; a weight of 0.5 for concurrent username login similarity scores; a weight of 0.3 for concurrent outbound data packet similarity scores; and/or a weight of 0.2 for concurrent inbound data packet similarity scores; etc. In this example, the computer system can then: multiply each similarity score between the first and second endpoint device containers by its corresponding weight; calculate a sum of these weighted similarity scores; and store the sum as the composite similarity score between the first and second endpoint device containers.

The computer system can then repeat this process to generate a first set of composite similarity scores that represent similarities between the first endpoint device container and each other endpoint device container associated with the second security technology.

The computer system can then identify highest composite similarity score in this first set of composite similarity scores. If this highest composite similarity score—between the first endpoint device container associated with the first security technology and a second endpoint device container associated with the second security technology—exceeds a threshold score, the computer system can: identify these endpoint device containers as corresponding to the same endpoint device; and confirm that both the first and second security technologies are active on this endpoint device during the target time interval. Accordingly, the computer system can: write a first unique endpoint device identifier for this endpoint device to the manifest; and label the first endpoint device identifier with identifiers of both the first and second security technologies. The computer system can also store additional characteristics of the first endpoint device—derived from the first and second endpoint device containers—in the manifest, such as: security policy configurations of the first and second security technologies at the first endpoint device; an operating system of the first endpoint device; a device type (e.g., laptop computer, smartphone) of the first endpoint device; registration times for the first and second security technologies at the first endpoint device; a last network connection time for the first endpoint device; a username logged into the first endpoint device; inbound and outbound traffic size and frequency; etc.

Otherwise, if this highest composite similarity score—between the first endpoint device container associated with the first security technology and any endpoint device container associated with the second security technology—falls below the threshold score, the computer system can: determine that the second security technology is not deployed on the first endpoint device or was otherwise not active during the target time interval; and label the first endpoint device identifier in the manifest with an identifier of the first security technology only. The computer system can also store additional characteristics of the first endpoint device—derived from the first endpoint device container only—first endpoint device identifier in the manifest.

The computer system can then: repeat this process for each other endpoint device container associated with a third security technology designated by the security policy in order to calculate a second set of composite similarity scores that represent similarities between the first endpoint device container and each endpoint device container associated with the third security technology; and identify a highest composite similarity score in this second set of composite similarity scores. If this highest composite similarity score—between the first endpoint device container associated with the first security technology and a third endpoint device container associated with the third security technology—exceeds the threshold score, the computer system can: further label the first endpoint device identifier in the manifest with an identifier of the third security technology; and store additional characteristics of the first endpoint device—derived from the second endpoint device container—with the first endpoint device identifier in the manifest. (The computer system can also verify that a composite similarity score between the second and third endpoint device containers exceeds the threshold similarity score before labeling the first endpoint device identifier with the identifier of the third security technology.)

The computer system can then repeat this process for each other security technology designated by the security policy in order to: identify endpoint device containers—associated with these other security technologies—that correspond to the same endpoint device as the first endpoint device container; and update the manifest accordingly.

The computer system can then repeat this process for each other endpoint device container associated with the first security technology in order to: identify endpoint device containers—associated with these other security technologies—that correspond to the same endpoint devices represented in the first set of endpoint device containers associated with the first security technology; and update the manifest accordingly.

The computer system can then repeat this process for each other security technology to: identify and/or validate correspondence between endpoint device containers associated with all security technologies designated by the security policy; and update the manifest accordingly.

7.1.1 Example

In particular, the computer system can: identify a first subset of endpoint devices configured with both a first security technology and a second security technology in Block S140 based on correspondence between data (e.g., fixed identifying data and variable status data) contained in a first subset of endpoint device containers associated with the first security technology and a second subset of endpoint device containers associated with the second security technology; and similarly identify a second subset of endpoint devices configured with a first security technology and not the second security technology in Block S140 based on lack of correspondence between data (e.g., fixed identifying data and variable status data) contained in a third subset of endpoint device containers associated with the first security technology and a fourth subset of endpoint device containers associated with the second security technology.

For example, during a current time interval, the computer system can: retrieve a first endpoint device container associated with the first security technology; retrieve a second endpoint device container associated with the second security technology; retrieve a third endpoint device container associated with the first security technology; and retrieve a fourth endpoint device container associated with the second security technology. The computer system then calculates a first correspondence score for the first endpoint device container and the second endpoint device container based on: similarities of fixed identifying data stored in the first endpoint device container and the second endpoint device container; and similarities of concurrent variable status data stored in the first endpoint device container and the second endpoint device container. Then, in response to this first correspondence score exceeding a threshold correspondence score, the computer system can: identify the first endpoint device container and the second endpoint device container as corresponding to a single (e.g., a first) endpoint device; and compile fixed identifying data and variable status data contained in the first endpoint device container and the second endpoint device container into a single (e.g., a first) representation of the first endpoint device during the current time interval.

Similarly, the computer system can calculate a second correspondence score for the third endpoint device container and the fourth endpoint device container based on: similarities of fixed identifying data stored in the third endpoint device container and the fourth endpoint device container; and similarities of concurrent variable status data stored in the third endpoint device container and the fourth endpoint device container. Then, in response to the second correspondence score falling below the threshold correspondence score, the computer system can: identify the third endpoint device container as corresponding to a second endpoint device distinct from a third endpoint device represented by the fourth endpoint device container; and compile fixed identifying data and variable status data contained in the third endpoint device container—and excluding fixed identifying data and variable status data contained in the fourth endpoint device container—into a second representation of the second endpoint device during the current time interval.

7.1.2 Repolling

In one variation shown in FIG. 4B, the computer system: polls objects directly from the set of security technologies at a first frequency during the first time interval, such as via API calls; and selectively repolls security technologies for additional objects if a correspondence between endpoint device containers associated with two different security technologies fall within an intermediate correspondence range. In particular, the computer system can set and/or implement an intermediate correspondence range: that indicates the endpoint device containers may correspond to the same endpoint device; that indicates differences are present between these endpoint device containers; and that these differences may be due to a change status of the same endpoint device over a time between polling or publication of objects by these security technologies.

For example, the computer system can: poll objects from the set of security technologies during the current time interval at a first polling frequency; retrieve a first endpoint device container associated with the first security technology; and retrieve a second endpoint device container associated with the second security technology. The computer system then calculates a first correspondence score for the first endpoint device container and the second endpoint device container based on: similarities of fixed identifying data stored in the first endpoint device container and the second endpoint device container; and similarities of concurrent variable status data stored in the first endpoint device container and the second endpoint device container.

Then, in response to the first correspondence score falling within an intermediate correspondence range, the computer system can: repoll objects from the set of security technologies at a second polling frequency—greater than the first polling frequency—during a next time interval; update the first endpoint device container based on objects received from the first security technology during the second time interval; update the second endpoint device container based on objects received from the second security technology during the second time interval; and calculate a revised correspondence score for the first endpoint device container and the second endpoint device container.

Then, in response to the revised correspondence score exceeding the intermediate correspondence range, the computer system can: identify the first endpoint device container and the second endpoint device container as corresponding to the same (e.g., a first) endpoint device; and compile fixed identifying data and variable status data contained in the first endpoint device container and the second endpoint device container into a first representation of the first endpoint device during the current time interval.

Conversely, in response to the revised correspondence score falling below the intermediate correspondence range, the computer system can: identify the first endpoint device container as corresponding to a first endpoint device distinct from a second endpoint device represented by the second endpoint device container; and compile fixed identifying data and variable status data contained in the first endpoint device container—and excluding fixed identifying data and variable status data contained in the second endpoint device container—into a representation of the first endpoint device during the current time interval.

7.2 Similarity Matrix

In a similar implementation, the computer system implements similar methods and techniques to: compare domain-specific values contained in endpoint device containers associated with the set of security technologies; generate a matrix of similarities between each endpoint device container and the endpoint device containers associated with each other security technology in the set; and identify groups of endpoint device containers—across multiple security technologies—that correspond to the same endpoint devices based on these similarity scores. In this implementation, the computer system can then: populate a manifest with one unique endpoint device identifier for each group of endpoint device containers; label each unique endpoint device identifier with an identifier of each security technology represented in its corresponding group of endpoint device containers; and store or link other characteristics from these groups of endpoint device containers with their corresponding unique endpoint device identifiers in the manifest.

7.3 Unification by Machine Learning

In yet another implementation, the computer system can implement machine learning and/or regression techniques to compare endpoint device containers—associated with multiple security technologies—across multiple domains and to identify groups of endpoint device containers that correspond to the same endpoint devices. The computer system can then generate a manifest or other record of these unique endpoint devices and the security technologies deployed on these endpoint devices based on these groups of endpoint device containers.

7.4 Data Aggregation

The computer system then compiles fixed identifying data and variable status data contained in a set of endpoint device containers—containing objects published by different security technologies but identified by the computer system as corresponding to the same endpoint device—into a composite (or "singular") container representing of the endpoint device during the current time interval.

In one example, the computer system: identifies a first endpoint device container associated with a first security technology and a second endpoint device container associated with as second security technology as corresponding to a singular endpoint device; extracts a first Internet Protocol value from the first endpoint device container; extracts a second Internet Protocol value from the second endpoint device container; and compiles the first Internet Protocol value and the second Internet Protocol value into a normalized Internet Protocol value of the first endpoint device based on stored Internet Protocol address handling characteristics of the security technologies. In this example, the computer system can also: extract an operating system identifier from the first endpoint device container (which may not be captured in objects published by the second security technology); and extract a user identifier from the second endpoint device container (which may not be captured in objects published by the first security technology). The computer system can then compile the normalized Internet Protocol value, the operating system identifier, the user identifier, a first identifier of the first security technology, and a second identifier of the second security technology, etc. into the first representation of the first endpoint device during the current time interval.

8. User Interface and Visualizations

Blocks S160 and S162 of the method S100 recite, at an operator portal: receiving selection of a subset of security technologies, in the set of security technologies; and rendering a visualization depicting quantities of endpoint devices labeled with permutations of the subset of security technologies in the manifest. Generally, in Blocks S160 and S162, the computer system interfaces with an operator (e.g., a security analyst, a network administrator) via an operator portal: to receive selection of a set of security technologies of interest (e.g., between one and five security technologies, inclusive); and to generate a visualization representing unique endpoint devices on which each of these selected security technologies is deployed and active during the target time interval, as shown in FIGS. 2, 3, 4C, and 4D.

8.1 Real-Time Endpoint Agent Deployment Efficacy

In one implementation shown in FIG. 2, the computer system: automatically sets the target time interval to a real-time sampling window, such as from a preceding hour up to the current time; and executes the foregoing methods and techniques to generate a manifest based on objects published by the set of security technologies during the target time window. In this implementation, the operator portal: renders a menu (e.g., a dropdown menu, a list) of security technologies designated in the security policy within a user interface; and prompts the operator to select security technologies of interest from the menu.

8.1.1 First Security Technology Selection

In this implementation, when the operator selects a first security technology of interest, the computer system queries the manifest for a first quantity of unique endpoint device identifiers labeled with the first security technology of interest. The operator portal then: renders a first circle (or other closed curve) within the user interface; and annotates the first circle with the first quantity of unique endpoint device identifiers labeled with the first security technology of interest. More specifically, once the operator selects the first security technology of interest, the operator portal can render a single-set Venn diagram depicting a quantity of unique endpoint devices on which the first security technology of interest is deployed and currently active.

Subsequently, when the user selects the interior of the first circle, the operator portal can populate a list or table of characteristics of these endpoint devices on which the first security technology of interest is deployed and currently active. For example, the operator portal can: generate a list or table including the MAC address, operating system, IP address(es), username(s), and/or time of last inbound or outbound transmission detected by the first security technology, etc. for each endpoint device represented by the interior of the first circle (i.e., endpoint devices on which the first security technology is deployed); and then render this list or table for the operator, as shown in FIG. 2.

Furthermore, if the user selects a particular endpoint device from this list or table, the operator portal can: extract additional characteristics of this particular endpoint device previously derived from corresponding endpoint device containers and stored in the manifest. (Alternatively, the operator portal can: retrieve a set of endpoint device containers—associated with one or more security technologies—representing this particular endpoint device; extract single-point and/or timeseries data (e.g., timeseries username, network activity, network connection and disconnection times, detected security threats) from these endpoint device containers; and present these data to the operator via the user interface.)

8.1.2 Second Security Technology Selection

Then, when the operator selects a second security technology of interest, the computer system can query the manifest for: a second quantity of unique endpoint device identifiers labeled with the second security technology of interest; and a first combined quantity of unique endpoint device identifiers labeled with both the first and second security technologies of interests. The operator portal can then: render a second circle (or other closed curve) intersecting the first circle within the user interface; annotate the intersection of the first and second circles with the first combined quantity of unique endpoint device identifiers labeled with the first and second security technologies of interest; annotate a section of the first circle disjointed from the second circle with a difference between the first quantity and the first combined quantity; and annotate a section of the second circle disjointed from the first circle with a difference between the second quantity and the first combined quantity.

Therefore, the operator portal can render a two-set Venn diagram depicting: a first quantity of unique endpoint devices on which the first security technology of interest is deployed and currently active but on which the second security technology is not currently deployed or active; a second quantity of unique endpoint devices on which the second security technology of interest is deployed and currently active but on which the first security technology is not currently deployed or active; and a first combined quantity of unique endpoint devices on which both the first and second security technologies of interest are deployed and currently active.

Subsequently, when the user selects the interior of the first circle disjoint from the second circle, the operator portal can: generate a first list or table including the MAC address, operating system, IP address(es), username(s), and/or time of last inbound or outbound transmission detected by the first security technology, etc. for each endpoint device represented by the section of the first circle disjointed from the second circle (i.e., endpoint devices on which the first security technology is deployed but on which the second security technology is not deployed); and then render this first list or table within the user interface. Similarly, when the user selects the intersection of the first and second circles, the operator portal can: generate a second list or table including the MAC address, operating system, IP address(es), username(s), and/or time of last inbound or outbound transmission detected by the first and second security technologies, etc. for each endpoint device represented by the intersection of the first and second circles (i.e., endpoint devices on which both the first and second security technologies deployed); and then render this second list or table within the user interface.

8.1.3 Third Security Technology Selection

Furthermore, when the operator selects a third security technology of interest, the computer system can query the manifest for quantities of unique endpoint device identifiers labeled with: the first security technology but not the second or third security technologies; the second security technology but not the first or third security technologies; the third security technology but not the first or second security technologies; the first and second security technologies but not the third security technology; the first and third security technologies but not the second security technology; the second and third security technologies but not the first security technology; and the first, second, and third security technologies. The operator portal can then: render a third circle (or other closed curve) intersecting the first and second circles within the user interface; and populate disjoint and intersecting regions of the first, second, and third circles with the foregoing quantities, as shown in FIG. 2.

Therefore, the operator portal can render a three-set Venn diagram depicting quantities of unique endpoint devices—currently (or recently) connected to the computer network—on which combinations of the first, second, and third security technologies of interest are currently deployed and active.

Subsequently, when the user selects the interior of the first circle disjoint from the second and third circles, the operator portal can: generate a first list or table including the MAC address, operating system, IP address(es), username(s), and/or time of last inbound or outbound transmission detected by the first security technology, etc. for each endpoint device represented by the section of the first circle disjointed from the second circle (i.e., endpoint devices on which the first security technology is deployed but on which the second and third security technologies are not deployed); and then render this first list or table within the user interface. Similarly, when the user selects the intersection of the first and second circles, the operator portal can: generate a second list or table including the MAC address, operating system, IP address(es), username(s), and/or time of last inbound or outbound transmission detected by the first and second security technologies, etc. for each endpoint device represented by the intersection of the first and second circles (i.e., endpoint devices on which both the first and second security technologies deployed but on which the third security technology is not deployed); and then render this second list or table within the user interface. Furthermore, when the user selects the intersection of the first, second, and third circles, the operator portal can: generate a third list or table including the MAC address, operating system, IP address (es), username(s), and/or time of last inbound or outbound transmission detected by the first, second, and third security technologies, etc. for each endpoint device represented by the intersection of the first, second, and third circles (i.e., endpoint devices on which the first, second, and third security technologies are deployed); and then render this third list or table within the user interface.

8.1.3.1 Venn Diagram Example

In particular, the computer system can implement methods and techniques described above to: identify a first subset of endpoint devices, in the set of endpoint devices, configured with a first security technology and a second security technology in the set of security technologies in Block S140 based on correspondence between fixed identifying data and variable status data contained in a first subset of endpoint device containers associated with the first security technology and the second security technology; and identify a second subset of endpoint devices, in the set of endpoint devices, configured with the first security technology and excluding the second security technology in Block S140 based on absence of correspondence between fixed identifying data and variable status data contained in a second subset of endpoint device containers associated with the first security technology and the second security technology.

Then, in response to selection of the first security technology and the second security technology, the computer system can generate a visualization (e.g., a Venn diagram) representing: the first subset of endpoint devices configured with the first security technology and the second security technology; and the second subset of endpoint devices configured with the first security technology and excluding the second security technology in Block S162.

Figure 4C:
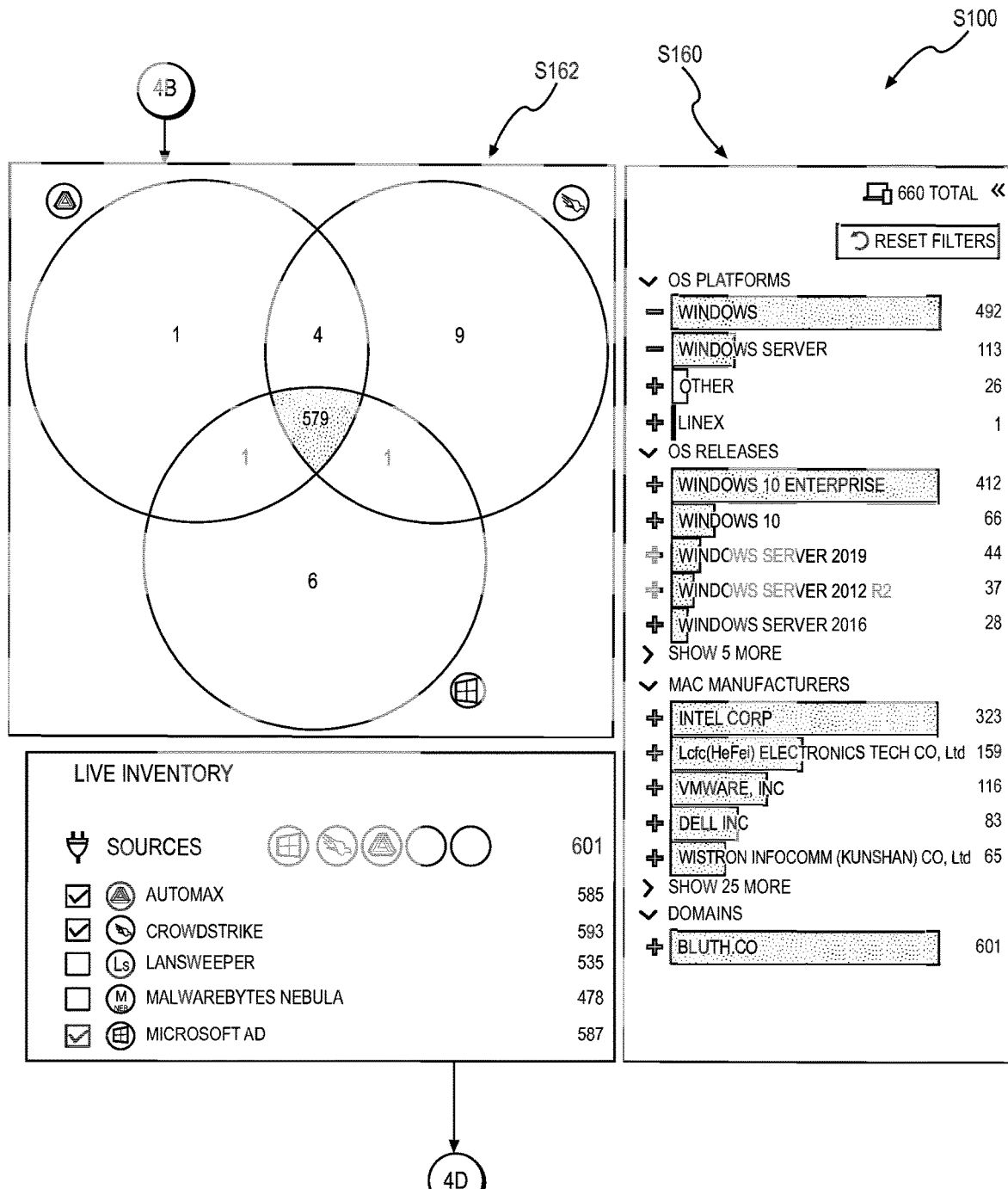

In one example shown in FIG. 4C, in response to an operator selecting the first security technology and the second security technology at the operator portal, the computer system can initialize a visualization that includes: a first area corresponding to the first security technology; and a second area corresponding to the second security technology and partially intersecting the first area. The computer system can also: annotate a first intersection of the first area and the second area in the visualization with a first quantity of endpoint devices in the first subset of endpoint devices configured with both the first and second security technologies; annotate the first area—outside of the second area—in the visualization with a second quantity of endpoint devices in the second subset of endpoint devices configured with the first security technology but omitting the second security technology; and render the visualization within the operator portal.

In this example, the computer system can also: link the first intersection in the visualization to identifiers of the first subset of endpoint devices; and link the first area—outside of the second area—in the visualization to identifiers of the second subset of endpoint devices. Then, in response to the operator selecting the first intersection in the visualization, the operator portal can render a first list of identifiers of the first subset of endpoint devices. Accordingly, in response to selection of a first identifier—from this first list of identifiers that represents the first subset of endpoint devices—the operator portal can: retrieve a composite endpoint device container containing fixed identifying and variable status data aggregated from the first and second security technologies and associated with the first identifier; and present these data—which represent the first endpoint device during the currently time interval—to the operator.

Furthermore, in this example, the computer system can implement similar methods and techniques to identify a third subset of endpoint devices configured with the first security technology, the second security technology, and a third security technology based on correspondence between fixed identifying data and variable status data contained in a third subset of endpoint device containers associated with the first, second, and third security technologies. Similarly, the computer system can identify a fourth subset of endpoint devices configured with the first security technology, but excluding the second security technology and the third security technology based on absence of correspondence between fixed identifying data and variable status data contained in a fourth subset of endpoint device containers associated with the first security technology, the second security technology, and the third security technology. The computer system can also identify a fifth subset of endpoint devices configured with the first security technology, configured with the second security technology, and excluding the third security technology based on: correspondence between fixed identifying data and variable status data contained in a fifth subset of endpoint device containers associated with the first security technology and the second security technology; and absence of correspondence between fixed identifying data and variable status data contained in the fifth subset of endpoint device containers and endpoint device containers associated with the third security technology.

Then, in response to the operator further selecting of the third security technology at the operator portal, the operator portal can augment the visualization with a third area: corresponding to the third security technology; partially intersecting the first area; partially intersecting the second area; and partially intersecting the first intersection. The operator portal can also: annotate a center intersection of the first area, the second area, and the third area with a third quantity of endpoint devices in the third subset of endpoint devices; annotate the first area, outside of the second area and the third area, with a fourth quantity of endpoint devices in the fourth subset of endpoint devices; and annotate a second intersection of the first area and the second area, excluding the third area, with a fifth quantity of endpoint devices in the fifth subset of endpoint devices.

The computer system and the operator portal can repeat the process to update the visualization based on additional and alternate security technology selections entered by the operator.

8.1.4 Additional Security Technology Selections

Figure 4D:
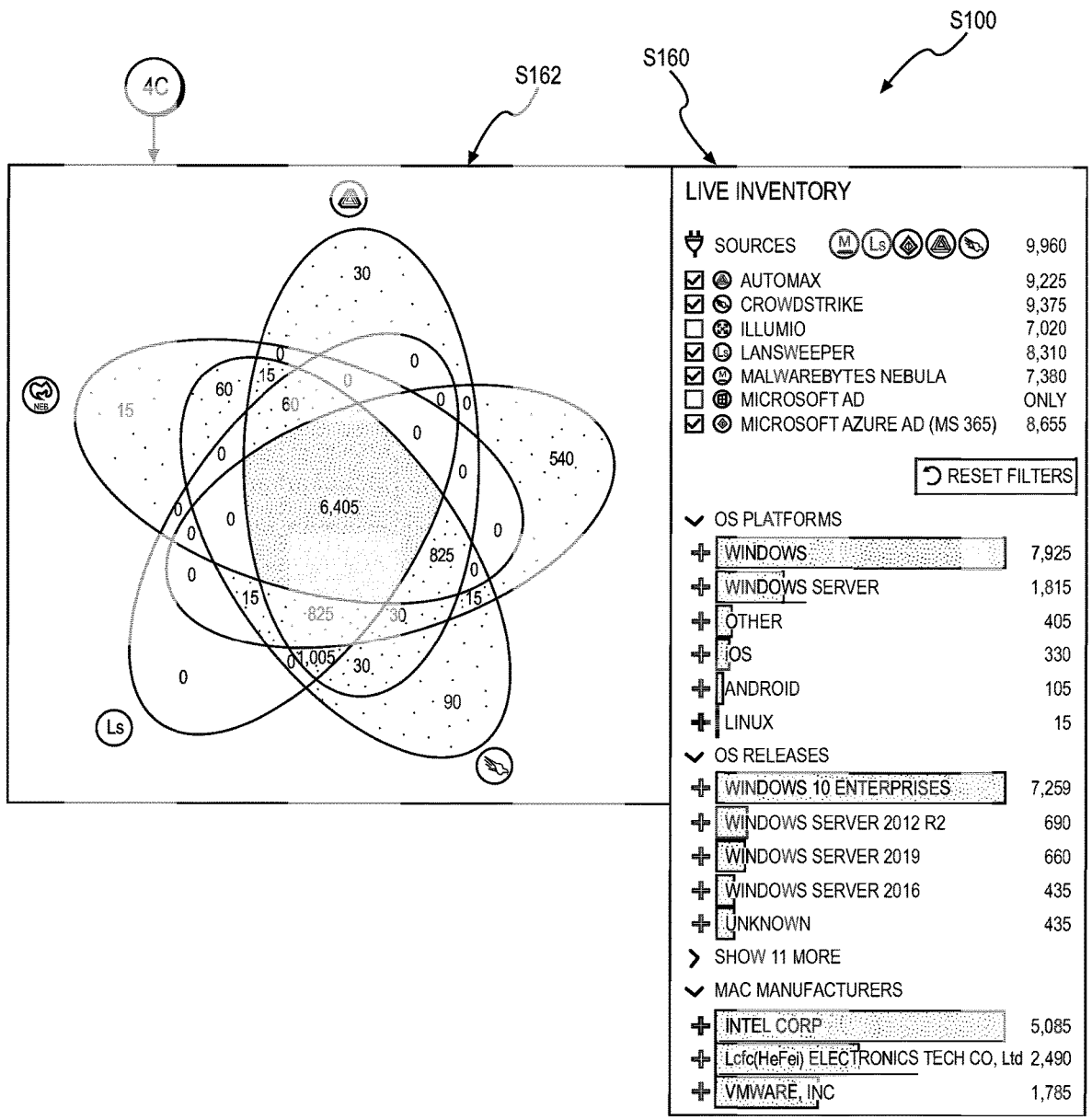

As shown in FIGS. 3 and 4D, the computer system and the operator portal can implement similar methods and techniques to generate four-set, five-set, etc. Venn diagrams depicting quantities of unique endpoint devices—currently (or recently) connected to the computer network—on which combinations of security technologies of interest are currently deployed and active. The operator portal can also implement similar methods and techniques to update the visualization in response to de-selection of a security technology of interest and/or selection of an alternate security technology of interest 8.1.5 Other Filters In one variation shown in FIG. 4D, the operator portal: renders a secondary menu of endpoint device characteristics (e.g., operating systems, device types, network activity frequency, detected security threats, security policy, security technology registration time, not running a particular security technology or other technology); and prompts or enables the operator to select an endpoint device characteristic from this secondary menu. Then, in response to the operator selecting a particular endpoint device characteristic, the operator portal can: add a region (e.g., a circle) representing this particular characteristic to the visualization; query the manifest for quantities of endpoint devices that include and exclude this particular characteristic and on which selected security technologies of interest—currently selected by the operator—are and are not deployed; and populate the visualization with these quantities.

Therefore, in this variation, the operator portal can generate and render a visualization that reflects combinations of: one or more security technologies of interest; and one or more endpoint device characteristics representative of endpoint devices connected to the computer network during the target time interval.

Alternatively, the operator portal (and/or the computer system) can: filter the manifest by a particular endpoint device characteristic selected by the operator; and generate and render a visualization that reflects combinations of one or more security technologies of interest for all endpoint devices—connected to the computer network during the target time interval—that match the particular endpoint device characteristic thus selected by the operator.

9. Other Endpoint Device Technologies

Furthermore, the computer system and the operator portal can additionally or alternatively execute Blocks of the method S100 to derive efficacy metrics for tools and software technologies deployed on endpoint devices connected to the network, such as: team communication software; work processors; and/or software development tools; etc.

More specifically, the computer system can implement similar methods and techniques described above to poll these non-security technologies, endpoint devices, and/or the network—such as via APIs—for objects representing deployment, status, and/or configuration of these technologies and endpoint devices. The computer system can then fuse and reconcile these objects into a comprehensive inventory of endpoint devices connected to the network, including whether security technologies and these other technologies are installed on these endpoint devices and their configurations, as shown in FIG. 4A.

For example, the computer system can: access a second set of objects generated by a productivity tool during the current time interval and representing characteristics of a subset of endpoint devices, in the set of endpoint devices, configured with the security technology; and partition the second set of objects into a second set of object groups in Block S120, wherein each object group in the second set of object groups represents statuses of an endpoint device during the current time interval. Then, for each object group in the second set of object groups, the computer system can aggregate characteristics represented in objects in the object group into an endpoint device container—in a second set of endpoint device containers—associated with the productivity tool and containing fixed identifying data and variable status data representing an endpoint device in the subset of endpoint devices in Block S130.

The computer system can then implement methods and techniques described above to: identify a third subset of endpoint devices configured with the first security technology and the productivity tool based on correspondence between fixed identifying data and variable status data contained in a third subset of endpoint device containers associated with the first security technology and contained in the second set of endpoint device containers associated with the productivity tool; and identify a fourth subset of endpoint devices configured with the productivity tool and excluding the first security technology based on absence of correspondence between fixed identifying data and variable status data contained in a fourth subset of endpoint device containers associated with the first security technology and contained in the second set of endpoint device containers.

Accordingly, the computer system can generate (or update) the visualization to further represent: the third subset of endpoint devices configured with the first security technology and the productivity tool; and the fourth subset of endpoint devices configured with the productivity tool and excluding the first security technology.

10. Network Activity

Generally, over time, users may connect device—not installed with any security technology designated by the security policy—to the computer network, such as personal smartphones and smartwatches. Therefore, execute of the method S100 as described above based on logs published by security technologies may expose all endpoint devices with at least one security technology installed but may fail to detect such endpoint device with none of these security technologies installed.

Therefore, in one variation, the computer system implements similar methods and techniques: to access a network activity log—generated by one or more network device security technologies (e.g., a firewall, a network sensor)—representing network objects involving devices connected to the computer network during the target time interval; and to compile these network objects into a set of network-based endpoint device containers. For example, the computer system can access a network activity log populated with a sequence of alerts, each containing: a timestamp; a sender (or "source") IP address; a sender port; a recipient (or "destination") IP address; a recipient port; a communication protocol; and a packet size (or "length"); etc. The computer system can then implement methods and techniques described above to compile these alerts into a set of endpoint device containers, each including: an IP address of an endpoint device within the computer network; and transient communication-related identifiers (e.g., timestamps, ports, destination or source IP addresses, and/or data packet size).

The computer system can then implement methods and techniques described above: to merge these network-based endpoint device containers with the endpoint device containers derived from endpoint security technology logs described above; to populate the manifest with unique endpoint device identifiers represented across these endpoint device containers; and to label each of these unique endpoint device identifiers with combinations of security technologies that detected these endpoint devices during the target time interval (i.e., none, one, two, . . . , or all security technologies specified by the security policy). For example, if the computer system identifies a particular endpoint device—within the computer network—in an endpoint device container derived from the network activity log but fails to match the endpoint device container to another endpoint device container derived from a log published by at least one endpoint security technology, the computer system can: write a unique endpoint device identifier of this particular endpoint device to the manifest; and label this unique endpoint device identifier with absence of any deployed or active security technology.

Therefore, the computer system can implement methods and techniques described above to fuse unified security technology inventory with network and/or firewall activity logs to detect endpoint devices connected to the computer network but not executing any security technology designated in the security policy.

For example, the computer system can: poll the computer network for a second set of objects representing characteristics of a second subset of endpoint devices connected to the computer network during the current time interval; and partition the second set of objects into a second set of object groups in Block S120, wherein each object group in the second set of object groups represents statuses of an endpoint device during the current time interval. Then, for each object group in this second set of object groups, the computer system can aggregate characteristics represented in objects in the object group into an endpoint device container that contains fixed identifying data and variable status data representing an endpoint device in this second subset of endpoint devices in Block S130. Furthermore, the computer system can identify a third subset of endpoint devices that excludes the first security technology and the second security technology—but that were detected on the computer network during the current time interval—based on absence of correspondence between fixed identifying data and variable status data contained in the first set of endpoint device containers and a third subset of endpoint device containers in the second set of endpoint device containers.

Then, in this example, the computer system can generate (or update) the visualization to represent: the first subset of endpoint devices that include the first security technology and the second security technology; the second subset of endpoint devices that include the first security technology and exclude the second security technology; and the third subset of endpoint devices that exclude both the first and second security technologies.

10.1 User Interface and Visualizations

In this variation, the operator portal can populate the menu described above with: identifiers of each security technology designated in the security portal; and a menu option for absence of any deployed or active security technology. The operator portal can then implement methods and techniques described above to generate and render a visualization representing combinations—and absence—of security technologies of interest deployed on endpoint device connected to the computer network during the target time interval based on selected from this menu.

For example, when the operator selects a first security technology of interest, a second security technology of interest, and absence of a (or "no") security technology from the security technology menu, the computer system can query the manifest for: a first quantity of unique endpoint device identifiers labeled with at least the first security technology of interest; a second quantity of unique endpoint device identifiers labeled with at least the second security technology of interest; a first combined quantity of unique endpoint device identifiers labeled with at least both the first and second security technologies of interests; and a total quantity of unique endpoint device identifiers represented in the manifest. The operator portal can then: render a first circle (or other closed curve) within the user interface; render a second circle intersecting the first circle; render a third circle encompassing the first and second circles; annotate the intersection of the first and second circles with the first combined quantity of unique endpoint device identifiers labeled with the first and second security technologies of interest; annotate a first section of the first circle disjointed from the second circle with a difference between the first quantity and the first combined quantity; annotate a second section of the second circle disjointed from the first circle with a difference between the second quantity and the first combined quantity; calculate a third quantity equal to the total quantity less the first quantity and less the second quantity; and annotate a third section of the third circle disjointed from the first and second circles with the third quantity.

Therefore, in this example, the intersection of the first and second circles can indicate a quantity of endpoint devices on which at least the first and second security technologies are deployed and active during the target time interval. Conversely, the first section of the first circle can identify a quantity of endpoint devices on which the first security technology is deployed and active during the target time interval but on which second security technology is not. Similarly, the second section of the second circle can identify a quantity of endpoint devices on which the second security technology is deployed and active during the target time interval but on which first security technology is not. Furthermore, the third section of the third circle can identify a quantity of endpoint devices on which neither the first or second security technologies are deployed and active during the target time interval.

Thus, in this example, the operator portal can render a three-set Venn diagram depicting quantities of unique endpoint devices currently (or recently) connected to the computer network and on which no, either, or both the first and second security technologies of interest are currently deployed and active.

11. Search

In one variation, the operator portal can also interface with the operator to receive multiple device search terms, such as, "[What device] [not running security technology X] was [on the network on 01-JAN-2021] [with IP address Y]."

Because the computer system links the manifest and/or the endpoint device containers as described above, the computer system can then scan the manifest and/or the endpoint device containers for these values and return a list of unique endpoint devices that fulfill each of these terms. The operator portal can then present this list of unique endpoint devices to the operator.

12. Security Policy

In one variation, the computer system: accesses a security policy for the computer network in Block S170; and generates a prompt to selectively investigate endpoint devices in Block S172 based on deviation from the security policy. More specifically, the computer system can: access the security policy that defines rules for combinations and configurations of security technologies (and non-security tools) deployed on endpoint devices connected to the computer network; compare these rules to endpoint device configurations recorded in the current manifest; detect differences between these rules and configurations of individual endpoint devices (or groups, clusters of endpoint devices); and selectively prompt security personnel to investigate these endpoint devices. For example, in response to identifying a particular endpoint device that deviates from a security technology configuration rule contained in the security policy, the computer system can prompt security personnel to: quarantine the endpoint device; push a systems or security technology update to the endpoint device; or limit account or user access at the endpoint device until the endpoint device is properly reconfigured.

For example, the computer system can implement methods and techniques described above to: identify the first subset of endpoint devices configured with the first security technology in a first configuration and the second security technology in a target configuration based on correspondence between fixed identifying data and variable status data contained in a first subset of endpoint device containers generated from objects polled from these security technologies; identify a second subset of endpoint devices configured with the first security technology and excluding the second security technology based on absence of correspondence between fixed identifying data and variable status data contained in a second subset of endpoint device containers associated with the first security technology and the second security technology; and identify a third subset of endpoint devices configured with the first security technology in a second configuration and the second security technology in the target configuration based on correspondence between fixed identifying data and variable status data contained in the third subset of endpoint device containers associated with the first security technology and the second security technology.

Accordingly, in response to the security policy specifying deployment of the first security technology in the first configuration and the second security technology in the target configuration, the computer system can: flag the second and third subsets of endpoint devices; generate a prompt to selectively investigate the second subset of endpoint devices for absence of the second security technology; generate a second prompt to selectively investigate the third subset of endpoint devices for improper configuration of the first security technology; and serve the first and second prompts to security personnel affiliated with the computer network.

As described above, the computer system can: poll objects from the set of security technologies during the first time interval at a first polling frequency; and can compile objects collected from security technologies during the first time interval into object groups and a manifest of endpoint devices connected to the computer network during the first time interval. However, in response to identifying a subset of endpoint devices that fail to fulfill the security policy, the computer system can: increase polling frequency for all security technologies, for security technologies that are improperly configured within this subset of endpoint devices, or for this subset of endpoint devices specifically; and update the manifest at an increased frequency (e.g., hourly rather than daily) in light of these noncompliant endpoint devices. For example, the computer system can: increase a polling frequency during a current time interval in response to detecting an increase quantity (or ratio) of endpoint devices on the computer network that are improperly configured; generate sets of endpoint device containers based on objects polled from the set of security technologies at this increased polling frequency; update the manifest of endpoint devices and configurations at a greater frequency based on the endpoint device containers; and selectively update and prompts to investigate noncompliant endpoint devices represented in these manifest updates.

13. Next Polling Interval

The computer system can repeat the foregoing process over time, such as within predefined polling intervals (e.g., hourly, daily, weekly) or when triggered by security personnel, to: aggregate (e.g., poll) objects from security technologies (and/or productivity tools, etc.) deployed on endpoint devices on the computer network; derive statuses of these endpoint devices from these objects; and generate a new manifest for each polling interval.

In particular, the computer system can execute Blocks of the method S100 during a first time interval to generate the manifest representing configurations of endpoint devices connected to the network during the first time interval. Later, the computer system can repeat the process to update the manifest (or generate a new manifest) that represents configurations of endpoint devices connected to the network during this next time interval.

14 Historical Trends

In one variation, the computing device and the operator portal cooperate to: receive a time window selection from the operator; generate endpoint device containers based on security technology log data generated during this time window; fuse these endpoint device containers into an manifest for this time window; and then generate and render a visualization based on this manifest and security technologies of interest selected by the operator. In particular, in this variation, rather than generate a manifest and a visualization based on real-time data (or near real-time, such as data logged over the past hour), the computer system and the operator portal can generate a manifest and a visualization based on a specific time window selected by the operator, such as: the past two minutes; the past 12 hours; the past week; the preceding day; the preceding week; or 10:52 AM to 3:54 PM on 11 Apr. 2019; etc. For example, in this implementation, the operator portal can: present a start time and date calendar and an end time and date calendar; capture start and end times and dates entered by the operator; define the target time window spanning these start and end times and dates; and then cooperate with the computer system to generate and render a visualization for this target time window as described above.

However, the computer system and the operator portal can implement any other methods or techniques to generate a visualization of security technology deployment efficacy across endpoint devices connected to the network in real-time, at any other previous time, or over any other historical time window.

15. Endpoint Device Container+Object Transformation

In one variation, the computer system can execute Blocks of the method S100 to transform the state and status of each endpoint device. Generally, each security technology that responds to a polling query from the computer system can provide a response with a unique or proprietary data format representing the object. Because various combinations of security technologies reporting states and status in different formats may be deployed on each endpoint device, a comprehensive report of the state and status of the endpoint device may include overlapping object data in various formats. Therefore, the computer system can execute Blocks of the method S100 by transforming (or "standardizing") the data format and/or content for each security technology responding to polling by the computer system into a first format.

For example, a first security technology can respond to a poll by indicating that the endpoint device is running an operating system "OS.10.5.9" and with an IP address denoted "IP101.23.213.1." A second security technology can respond to the same poll by indicating that the endpoint device is running an operating system "WIN.OS.10V5.9" and an IP address denoted "IP_address_101.23.213.1." In this example, the security technologies are reporting identical configurations for the endpoint device, but in an inconsistent format and lexicon. Accordingly, the computer system can execute Blocks of the method S100 by transforming one or both states (e.g., IP addresses) and statuses (e.g., operating systems) for each security technology response for each endpoint device into the first format. In particular, in this example, the computer system can: normalize operating system, IP address, and other data types to correlate objects across multiple security technologies; verify that these IP addresses contain valid IP values and valid IP address format; and similarly verify that other data types contained in endpoint device containers contain valid object values and valid object formats Generally, the computer system S100 can convert each log object into a standardized or consistent first format such that a resulting manifest characterizing the endpoint devices is complete and consistent. Similarly, the computer system can execute Blocks of the method S100 by transforming and standardizing empty or nonce fields reported by various security technologies to properly reflect a null or non-existent value for certain attributes or objects.

15.1 Correlation and Comparison

In another implementation, the computer system can execute Blocks of the method S100 by correlating and comparing a state and status of an object or a device at two or more selected times. Generally, the computer system can correlate and compare a state and status of a set of devices and/or all devices on the computer network at two or more selected times to generate a comprehensive and time-based characterization of the set of devices and the computer network. For example, the computer system can, for a single device or a set of devices, compare a first manifest derived from a first poll to a second manifest derived from a second poll. The computer system can then: compare first and second states and/or statuses of the device (or of a set of devices) to detect time-based changes in the state and/or status of the device (e.g., a telemetry of the device or set of devices); and generate notifications or prompts to investigate or quarantine individual endpoint devices accordingly.

Generally, the computer system can compare a prior manifest to a current manifest in order to generate a real-time or near real-time representation of any change events occurring for a selected set of devices on the computer network over a corresponding time period. Alternatively, the computer system can compare sets or groups of current and prior manifests to detect and/or determine large scale patterns of security policy compliance or non-compliance for the selected device or set of devices. Generally, a change event can include both changes of state (e.g., provisioning, inventorying, changing location) as well as changes of status (OS upgrading, deploying new security technologies, assigning IP addresses, etc.).

As shown in FIG. 1, the computer system can execute Block S130 of the method S100 by, for each endpoint device connected to the computer network, detecting a change of state by comparing a first (current) manifest to a second (prior) manifest. As noted above, a change in state can include a provisioning or deprovisioning of an endpoint device, for example when a new employee is onboarded and given an enterprise laptop or smartphone. A prior manifest may indicate that the newly provisioned laptop was associated with another user (e.g., recycled within the enterprise). Alternatively, the newly provisioned laptop may not appear on the prior manifest, in which case the computer system can identify the newly provisioned laptop as also being new to the enterprise.

In another example implementation, the computer system can execute Block S130 of the method S100 by detecting a change of state in an endpoint device including a change in location or connection status of the endpoint device. Generally, an endpoint device, such as a laptop, may connect to the computer network via an associated IP address, which may be dynamic or static in nature, and which may also be indicative of a general or specific location of the endpoint device. Accordingly, if the computer system detects a change in IP address associated with an endpoint device between a current and prior manifest, the computer system can detect a change of state in the endpoint device. Therefore, the computer system can execute Blocks of the method S100 to determine if a user has moved the device between locations and accessed the computer network from different locations, some or all of which may be against enterprise security policy.

As shown in FIG. 1, the computer system can execute Block S140 of the method S100 to detect a change of status for endpoint devices connected to the computer network. As noted above, a change of status can include a change in the operating parameters of the endpoint device, such as the operating system, security technologies, port activity, communication hardware access, authentication tools, and/or encryption tools. For example, the computer system can detect a change of status of an endpoint device if, according to distinct manifests, there is a change of the version of the operating system installed on the endpoint device. Therefore, if the enterprise requires that all users upgrade their operating systems to a newer or more secure version, then the computer system can execute Blocks of the method S100 to: poll the set of security technologies of the enterprise endpoints at regular intervals; generate manifests for each uniquely identified endpoint; and correlate and compare the periodic manifests to characterize a level of compliance with the enterprise OS requirements. Additionally, as noted in more detail below, the computer system can automatically transmit notifications of changes, security policy compliance, or security policy non-compliance to operators and/or other users within the enterprise.

In another example implementation, the computer system can execute Blocks of the method S100 to detect a change of status of an endpoint device relating to a security technology operating on the endpoint device. For example, an enterprise policy may require that users of mobile computing devices (e.g., laptops, tablets, or smartphones) maintain a minimum level of encryption of the data stored thereon. The computer system can therefore: periodically poll the set of security technologies of the enterprise endpoints; generate manifests for each uniquely identified endpoint; and correlate and compare the periodic manifests to detect endpoint devices that have changed status in the implementation of required encryption technologies.

Generally, the computer system can implement Blocks of the method S100 to detect, categorize, and correlate changes over time in an endpoint device status. Therefore, for a single asset or device, the computer system can detect and construct a timeline of its changes (either in state or status) over time. Likewise, for a set of assets or devices associated with the network, the computer system can detect, aggregate, and construct a timeline of their collective changes (either in state or status) over time. Additionally, the computer system can detect and construct a timeline of changes on or to the computer network as a composite of device changes (in status or state) over time, for example by generating a computer network perspective of a timeline illustrating a level of compliance with security technology adoption at endpoint devices over time.

Moreover, the computer system can execute Blocks of the method S100 to detect, determine, construct, and present changes in state or status that are indicative of a user-device relationship. Therefore, the computer system can detect changes in state or status for a user and, in response thereto, generate user behavior analytics that are indicative of a user's behavior vis-à-vis her device. For example, the computer system can generate a timeline of an endpoint device that may indicate that a user device experienced changes in access, authorization, or authentication technologies including for example: biometric or two-factor authentication enabled/disabled, additional/unknown users with administrative privileges on the endpoint device, or successive or repeated changes in a password or other authentication tool.

Likewise, the computer system can generate a timeline of an endpoint device that may indicate that a user device experienced repeated or successive IP address assignments, computer network accesses from disparate or undesirable locations, and/or computer network accesses at odd or off hours (e.g., non-work hours, weekends, holidays, etc.).

In another example implementation, the computer system can generate a timeline of an endpoint device that may indicate that a user device experienced repeated or successive changes in, or failures to run, required or suggested security technologies in violation of the enterprise security policy.

In another example implementation, the computer system can generate a timeline of an endpoint device that illustrates a complete history of the device from its initial provisioning into the computer network. Moreover, the computer system can generate a volatility model (e.g., rate of change of changes at the endpoint device) that is indicative of a potential user behavior security issue. For example, the computer system can determine from a series of successive manifests that a particular endpoint device has experienced a set of changes in state or status, and that timing of the set of changes is indicative of an accelerating pattern of behavior that poses a risk to the enterprise (e.g., because the user is exhibiting risky behaviors and/or because the endpoint device is malfunctioning or nearing its end of service).

15.2 API Interface

One example implementation of the method S100 can include, by the computer system, pushing the portfolio assessment to a third-party computer system associated with a third-party subscriber, such as via an application programming interface (API). Generally, the third-party computer system can include a software application (e.g., an enterprise software suite or application) that also interacts with the set of devices on the computer network. As noted above, exemplary third-party computer systems can include software-as-a-service (SaaS) software applications such as: CMDB services; SIEM services; vulnerability management services; PSA for MSSP services; accounting and financial management software services; and/or other applications developed for or by the third-party subscriber.

In one variation of the example implementation, the computer system can execute Block S160 of the method S100 by: expanding the portfolio assessment within the first format; transforming the portfolio assessment from the first format into a second format native to the third-party computer system; and loading the portfolio assessment in the second format from the computer system into the third-party computer system. As noted above, the first format of the portfolio assessment can include a transformed and registered format for receiving and reporting the presence and/or state of each device on the computer network. Therefore, the computer system can execute Block S160 of the method S100 to further transform the portfolio assessment from a first format into a second format (and/or a third format, fourth format) that is native to the third-party computer system, (e.g., a SaaS application of the type described herein). Furthermore, the computer system can execute Block S160 of the method S100 by pushing the second format portfolio assessment to the third-party computer system via an API call or push.

In operation, the computer system can execute Block S160 such that it is unseen or invisible to a user or operator of the third-party computer system. For example, a security operations or information technologist user of the third-party computer system may interface routinely with a CMDB or SIEM SaaS application. The computer system can execute Blocks of the method S100 described herein to: automatically and seamlessly update, publish, and push the portfolio assessment into the native software application (e.g., the CMDB) such that, from the user's perspective, the portfolio assessment is seamlessly integrated into the datasets, rendering, and presentation of the native CMDB data.

In one alternative implementation, computer system can push the portfolio assessment to the third-party computer system periodically, such as at a fixed interval. In another implementation, the computer system executes the portfolio assessment push in response to a threshold condition or occurrence, such as inventory changes, policy violations, changes in system status of a device (e.g., status of security technologies, directory services, vulnerability management tools, etc.) or other attribute changes in objects that the third-party computer system can ingest, process, and/or deliver to the end user.

In yet another implementation, the computer system executes the portfolio assessment push in response to a request (pull) from the third-party computer system. For example, the third-party computer system can, in response to a user input, request a current or historical portfolio assessment of the computer system through the API. The computer system can then: assemble the current or historical portfolio assessment, transform the portfolio assessment into the second format, and push the transformed portfolio assessment in the second format to the third-party computer system for processing, rendering, and/or display in response to the initial user request.

15.3 Hosted Access

In another implementation, the method S100 can include, by the computer system, selectively permitting access to the portfolio assessment. For example, the computer system can selectively permit access to a user affiliated with a third-party subscriber into the computer system (or a portion thereof), such that the third party-subscriber can access a portfolio assessment for a set of devices associated with the third-party subscriber.

For example, the computer system can execute Blocks of the method S100 by opening or permitting access into the computer system by an authenticated user affiliated with the third-party subscriber (e.g., a third-party subscriber associated with the devices on the computer network). In operation, an authenticated user can access the computer system to gather, access, view, and/or interact with the portfolio assessment of the devices associated with the third-party subscriber. Therefore, a security operator, accountant, information technology personnel, or other authenticated user can remotely log into the computer system and: request that the computer system execute techniques and methods described herein to generate the portfolio assessment; request that the computer system render the portfolio assessment; view and/or receive a presentation of the portfolio assessment; and/or interact with or otherwise manipulate the portfolio assessment through a local user interface.

For example, the computer system can: implement methods and techniques described above to fuse objects collected from various security technologies deployed on the computer network to identify configurations of endpoint devices connected to the network during a current time interval; extract a first set of endpoint device identifiers from endpoint device containers associated with the first and second security technologies and representing a first subset of endpoint devices; extract a second set of endpoint device identifiers from endpoint device containers associated with the first security technology, excluding the second security technology, and representing a second subset of endpoint devices; extract a third set of endpoint device identifiers from endpoint device containers associated with the computer network, excluding the first and second security technologies, and representing a third subset of endpoint devices. In this example, the computer system can then: compile the first, second, and third sets of endpoint device identifiers into a ledger of all endpoint devices connected to the computer network during the current time interval; and return this ledger to accounting or information technology personnel, such as once per week, once per month, or after each employee status change within the organization (e.g., to detect and identify new, unconfigured endpoint devices connected to the computer network when each new employee joins the organization).

In another implementation, in response to a request from the authenticated user received at the computer system, the computer system can execute Block S170 of the method S100 by: transforming the portfolio assessment into a second (or third, fourth, etc.) format; rendering and/or presenting the portfolio assessment for display at a local user interface in the second format; and/or transmitting a copy or rendition of the portfolio assessment in the second format to a local device associated with the authenticated user. Accordingly, an authenticated user can: access the computer system to view the portfolio assessment in the first format; request transformation of the portfolio assessment into a second format; view the portfolio assessment in the second format; request transmission of a copy or rendition of the portfolio assessment in the second format to the local device; and receive a copy or rendition of the portfolio assessment in the second format. In one example implementation, the computer system can execute foregoing techniques and methods to deliver an inventory report (e.g., portfolio assessment) of the devices on the computer network to an authenticated user (e.g., a controller or Chief Financial Officer) in a requested format (e.g., a format compatible with accounting or tax preparation software).

15.4 Example Implementations

The computer system can also execute the method S100 to handle inventory tracking and requests within a computer network.

15.4.1 Configuration Management Database

In one example implementation, the computer system can execute Blocks of the method S100 and interface with a third-party computer system that is a CMDB for IT operations, including for example ticketing systems for onboarding, offboarding, troubleshooting, monitoring, and/or maintaining a set of devices on the computer network. Rather than rely upon ad hoc or untrusted inventory data, the computer system can execute Blocks of the method S100 to consistently update and push accurate and near-real-time portfolio assessments to the CMDB. In daily and routine operation, an IT professional can therefore access and interact with the CMDB and rely upon updated and accurate inventory data pushed from the computer system executing Blocks of the method S100.

15.4.2 Security Operations

In another example implementation, the computer system can execute Blocks of the method S100 and interface with a third-party computer system that is a SIEM application used by security operations staff. For example, a SIEM system can monitor and/or generate potential security incident alerts transmissible to a member of security operations staff, who is then generally authorized to investigate and/or remediate the potential incident. Absent an accurate and near-real-time portfolio assessment, such as an investigation or remediation, can be time consuming and ineffective. However, the computer system can implement Blocks of the method S100 as described above to ensure that the portfolio assessment ingested at the SIEM is timely and accurate, such that members of the security operations staff can easily access crucial data.

For example, the security operations staff can access, through the native SIEM application, at least the following: current and historical IP addresses for the device in question; users associated with the device over time; security technologies employed by the device over time; location of the device over time; and/or any other reportable and trackable aspect or feature of the device gathered by the computer system in execution of the method S100.

15.4.3 Vulnerability Management

In another example implementation, the computer system can execute Blocks of the method S100 and interface with a third-party computer system that includes a vulnerability management application used by security operations and/or information technology staff. Generally, a vulnerability management application may scan a computer network and associated devices and software for potential vulnerabilities in network security and/or device security. However, absent an accurate and timely inventory of the devices and device history via a portfolio assessment, vulnerability management software may be unable to generate a complete and accurate assessment of the entire set of potential vulnerabilities. The computer system can execute Blocks of the method S100 to interface via an API with the vulnerability management application and push or feed an updated and near-real-time portfolio assessment to the vulnerability management application. Therefore the vulnerability management application—and associated users thereof—may rely on an accurate and near-real-time portfolio assessment of the entire asset inventory (devices, security technologies, etc.) connected to and/or associated with the computer network.

15.4.4 Professional Services Automation

In another example implementation, the computer system can execute Blocks of the method S100 and interface with a third-party computer system that is a professional services automation (PSA) application for a managed security service provider (MSSP). Example PSAs can include internal/external ticket flow systems, customer relationship management systems, and billing systems. For example, the computer system can execute Blocks of the method S100 to interface via an API with the PSA application and push or feed an updated and near-real-time portfolio assessment to the PSA application. Therefore the PSA application—and associated users thereof—may rely on an accurate and near-real-time portfolio assessment of the entire asset inventory (devices, security technologies, etc.) connected to and/or associated with the computer network, such as when generating bills or invoices that are dependent upon timely and accurate inventory counts.

15.4.5 Accounting and Asset Management

In another example implementation, the computer system can execute Blocks of the method S100 and interface with a third-party computer system that is an accounting or financial management software application. For example, an organization may implement accounting software to track internal asset inventories to ensure: appropriate and timely device depreciation; tracking and expensing of leased equipment, software, and/or devices; acquisitions of new equipment, software, and/or devices; disposition of equipment, software, and/or devices; and potential recapture or accounting considerations for any of the foregoing. For example, the computer system can execute Blocks of the method S100 to interface via an API with the accounting application and push or feed an updated and near-real-time portfolio assessment to the accounting application. Therefore the accounting application—and associated users thereof—may rely on an accurate and near-real-time portfolio assessment of the entire asset inventory (equipment, software, devices, etc.) connected to and/or associated with the computer network, for example when preparing financial statements, tax statements, and/or assessing the financial position of the organization.

15.4.6 Other Applications

In another example implementation, the computer system can execute Blocks of the method S100 and interface with a third-party computer system built on top of and interfacing with the portfolio assessment data. For example, the application can be configured to receive the portfolio assessment in the first format (e.g., as initially transformed by the computer system) and further transform the portfolio assessment and underlying data into a second format. Alternatively, the application be configured to receive the portfolio assessment in the first format; process the portfolio assessment in the first format; and render, present, reproduce, or otherwise deliver the portfolio assessment according to the application.

15.4.7 Example: Inter-Tool Data Transfer

In one implementation, the computer system converts a configuration of an endpoint device detected by a first security technology into a second format corresponding to a second security technology that failed to detect the endpoint device—such as due to misconfiguration or absence of the second security technology on the endpoint device—and pushed these data for the endpoint device in the second format to the security technology, which may then update its internal record or manifest to reflect this endpoint device that was otherwise undetected to the second security technology.

In one example, the computer system retrieves a first endpoint device container associated with the first security technology (e.g., containing objects published by the first security technology). The computer system then calculates a set of correspondence scores for the first endpoint device container and a second set of endpoint device containers associated with the second security technology, such as based on: similarities of fixed identifying data stored in the first endpoint device container and the second set endpoint device containers; and similarities of concurrent variable status data stored in the first endpoint device container and the second set of endpoint device containers. In response to the set of correspondence scores falling below a threshold correspondence score, the computer system identifies the endpoint device container as corresponding to an endpoint device configured with the first security technology but excluding the second security technology.

In this example, the computer system then: extracts a first set of fixed identifying data—in a first format corresponding to the first security technology—from the first endpoint device container; converts the first set of fixed identifying data into a first set of synthetic identifying data in a second format corresponding to the second security technology; returns the first set of synthetic identifying data to the second security technology; and triggers the second security technology to update an endpoint device inventory status of the computer network to reflect the first endpoint device—connected to the computer network and excluding the second security technology—during the first time interval. In this example, the computer system can convert the first set of fixed identifying data into the first set of synthetic identifying data in the second format: based on a predefined data conversion model for the first and second security technologies; or by reversing an artificial intelligence or machine learning model (e.g., trained on similarities and differences between objects collected from the first and second security technologies) as described above.

Additionally or alternatively, the computer system can serve a prompt to security personnel to install or update the second security technology on the endpoint device or generate a command to automatically install or update the second set technology on the endpoint device. Once the second security technology is installed on the endpoint device, the computer system can: execute methods and techniques repoll the second security technology; detect new objects received from the second security technology before and after the second security technology was installed or updated on the endpoint device; identify these new objects as corresponding to the second security technology and the endpoint device; detect or confirm correspondence between these new objects generated by the second security technology and objects generated by the first security technology for the endpoint device; and define or update a correspondence map or other model for unifying endpoint device containers across multiple security technologies based on this correspondence between objects generated by the first and second security technologies. Therefore, in this implementation, the computer system can develop and refine a correspondence map for unifying endpoint device containers—generated from objects published by multiple security technologies—based on changes in objects received from security technologies following security technology installations or updates on endpoint devices connected to the computer network.

As a person skilled in the art will recognize from the previous detailed description and from the figures and claims, modifications and changes can be made to the embodiments of the invention without departing from the scope of this invention as defined in the following claims.

We claim:

1. A method for monitoring a set of security technologies deployed across a set of endpoint devices affiliated with a computer network, the method comprising:
   generating a set of endpoint device containers for the set of security technologies, each endpoint device container in the set of endpoint device containers comprising fixed identifying data and variable status data representing an endpoint device during a first time interval;
   identifying a first subset of endpoint devices, in the set of endpoint devices, configured with a first security technology and a second security technology in the set of security technologies based on correspondence between fixed identifying data and variable status data contained in a first subset of endpoint device containers associated with the first security technology and the second security technology;
   identifying a second subset of endpoint devices, in the set of endpoint devices, configured with the first security technology and excluding the second security technology based on absence of correspondence between fixed identifying data and variable status data contained in a second subset of endpoint device containers associated with the first security technology and the second security technology;
   accessing a security policy for the computer network;
   generating a prompt to selectively investigate endpoint devices, in the second subset of endpoint devices, for absence of the second security technology; and
   serving the prompt to security personnel affiliated with the computer network.

2. The method of claim 1 further comprising:
   in response to selection of the first security technology and the second security technology, generating a visualization representing:
   the first subset of endpoint devices configured with the first security technology and the second security technology; and the second subset of endpoint devices configured with the first security technology and excluding the second security technology.

3. The method of claim 2, wherein generating the visualization comprises, in response to selection of the first security technology and the second security technology at an operator portal:
   initializing the visualization comprising:
      a first area corresponding to the first security technology; and
      a second area corresponding to the second security technology and partially intersecting the first area;
   annotating a first intersection of the first area and the second area with a first quantity of endpoint devices in the first subset of endpoint devices; and
   annotating the first area, outside of the second area, with a second quantity of endpoint devices in the second subset of endpoint devices.

4. The method of claim 3:
   wherein identifying the first subset of endpoint devices comprises:
      retrieving a first endpoint device container associated with the first security technology;
      retrieving a second endpoint device container associated with the second security technology;
      calculating a first correspondence score for the first endpoint device container and the second endpoint device container based on:
         similarities of fixed identifying data stored in the first endpoint device container and the second endpoint device container; and
         similarities of concurrent variable status data stored in the first endpoint device container and the second endpoint device container; and
      in response to the first correspondence score exceeding a threshold correspondence score:
         identifying the first endpoint device container and the second endpoint device container as corresponding to a first endpoint device, in the first subset of endpoint devices, configured with the first security technology and the second security technology; and
         compiling fixed identifying data and variable status data contained in the first endpoint device container and the second endpoint device container into a first representation of the first endpoint device during the first time interval; and
   further comprising:
      linking the first intersection to identifiers of the first subset of endpoint devices;
      linking the first area, outside of the second area, to identifiers of the second subset of endpoint devices;
      in response to selection of the first intersection, rendering a first list of identifiers of the first subset of endpoint devices within an operator portal; and
      in response to selection of a first identifier from the first list of identifiers of the first subset of endpoint devices, presenting the first representation of the first endpoint device during the first time interval within the operator portal.

5. The method of claim 1, further comprising compiling fixed identifying data and variable status data contained in the first endpoint device container and the second endpoint device container into a first representation of the first endpoint device by:
   extracting a first Internet Protocol value from the first endpoint device container;
   extracting a second Internet Protocol value from the second endpoint device container;
   compiling the first Internet Protocol value and the second Internet Protocol value into a normalized Internet Protocol value of the first endpoint device;
   extracting an operating system identifier from the first endpoint device container;
   extracting a user identifier from the second endpoint device container; and
   compiling the normalized Internet Protocol value, the operating system identifier, the user identifier, a first identifier of the first security technology, and a second identifier of the second security technology into the first representation of the first endpoint device during the first time interval.

6. The method of claim 1, wherein generating the set of endpoint device containers comprises:
   accessing a set of objects generated by a security technology of the set of security technologies during a first time interval and representing characteristics of a subset of endpoint devices, in the set of endpoint devices, configured with the security technology of the set of security technologies;
   partitioning the set of objects into a set of object groups, each object group in the set of object groups representing a sequence of statuses of an endpoint device, in the subset of endpoint devices, during the first time interval; and
   for each object group in the set of object groups, aggregating characteristics represented in objects in the object group into an endpoint device container, in the set of endpoint device containers, associated with the security technology and comprising fixed identifying data and variable status data representing an endpoint device in the subset of endpoint devices.

7. The method of claim 6:
   further comprising:
      polling the computer network for a second set of objects representing characteristics of a second subset of endpoint devices, in the set of endpoint devices, connected to the computer network during the first time interval;
      partitioning the second set of objects into a second set of object groups, each object group in the second set of object groups representing a sequence of statuses of an endpoint device, in the second subset of endpoint devices, during the first time interval;
      for each object group in the second set of object groups, aggregating characteristics represented in objects in the object group into an endpoint device container, in a second set of endpoint device containers, comprising fixed identifying data and variable status data representing an endpoint device in the second subset of endpoint devices; and
      identifying a third subset of endpoint devices, in the set of endpoint devices, excluding the first security technology and the second security technology based on absence of correspondence between fixed identifying data and variable status data contained in the first set of endpoint device containers and a third subset of endpoint device containers in the second set of endpoint device containers; and
      generating a visualization representing:
         the first subset of endpoint devices configured with the first security technology and the second security technology; and the second subset of endpoint devices configured with the first security technology and excluding the second security technology; and
the third subset of endpoint devices excluding the first security technology and the second security technology.

8. The method of claim 7, further comprising:
extracting a first set of endpoint device identifiers for the first subset of endpoint devices from the first subset of endpoint device containers;
extracting a second set of endpoint device identifiers for the second subset of endpoint devices from the second subset of endpoint device containers;
extracting a third set of endpoint device identifiers for the first subset of endpoint devices from the third set of endpoint device containers; and
compiling the first set of endpoint device identifiers, the second set of endpoint device identifiers, and the third set of endpoint device identifiers into a manifest of all endpoint devices connected to the computer network during the first time interval.

9. The method of claim 1:
wherein identifying the first subset of endpoint devices comprises:
 retrieving a first endpoint device container associated with the first security technology;
 retrieving a second endpoint device container associated with the second security technology;
 calculating a first correspondence score for the first endpoint device container and the second endpoint device container based on:
  similarities of fixed identifying data stored in the first endpoint device container and the second endpoint device container; and
  similarities of concurrent variable status data stored in the first endpoint device container and the second endpoint device container; and
 in response to the first correspondence score exceeding a threshold correspondence score:
  identifying the first endpoint device container and the second endpoint device container as corresponding to a first endpoint device, in the first subset of endpoint devices; and
  compiling fixed identifying data and variable status data contained in the first endpoint device container and the second endpoint device container into a first representation of the first endpoint device during the first time interval; and
wherein identifying the second subset of endpoint devices comprises:
 retrieving a third endpoint device container associated with the first security technology;
 retrieving a fourth endpoint device container associated with the second security technology;
 calculating a second correspondence score for the third endpoint device container and the fourth endpoint device container based on:
  similarities of fixed identifying data stored in the third endpoint device container and the fourth endpoint device container; and
  similarities of concurrent variable status data stored in the third endpoint device container and the fourth endpoint device container; and
 in response to the second correspondence score falling below the threshold correspondence score:
  identifying the third endpoint device container as corresponding to a second endpoint device, in the second subset of endpoint devices, distinct from a third endpoint device, in the set of endpoint devices, represented by the fourth endpoint device container; and
  compiling fixed identifying data and variable status data contained in the third endpoint device container, excluding fixed identifying data and variable status data contained in the fourth endpoint device container, into a second representation of the second endpoint device during the first time interval.

10. The method of claim 1:
wherein generating the set of endpoint device containers comprises polling objects from the set of security technologies during the first time interval at a first polling frequency; and
wherein identifying the first subset of endpoint devices comprises:
 retrieving a first endpoint device container associated with the first security technology;
 retrieving a second endpoint device container associated with the second security technology;
 calculating a first correspondence score for the first endpoint device container and the second endpoint device container based on:
  similarities of fixed identifying data stored in the first endpoint device container and the second endpoint device container; and
  similarities of concurrent variable status data stored in the first endpoint device container and the second endpoint device container; and
 in response to the first correspondence score falling within an intermediate correspondence range:
  repolling objects from the set of security technologies at a second polling frequency, greater than the first polling frequency, during a second time interval;
  updating the first endpoint device container based on objects received from the first security technology during the second time interval;
  updating the second endpoint device container based on objects received from the second security technology during the second time interval;
  calculating a revised correspondence score for the first endpoint device container and the second endpoint device container; and
  in response to the revised correspondence score exceeding the intermediate correspondence range:
   identifying the first endpoint device container and the second endpoint device container as corresponding to a first endpoint device, in the first subset of endpoint devices; and
   compiling fixed identifying data and variable status data contained in the first endpoint device container and the second endpoint device container into a first representation of the first endpoint device during the first time interval and the second time interval.

11. The method of claim 1:
wherein generating the set of endpoint device containers comprises, for each security technology in the set of security technologies, ingesting objects comprising log events streamed by the security technology for endpoint devices, in the set of endpoint devices, configured with the security technology during the first time interval; and wherein identifying the first subset of endpoint devices and identifying the second subset of endpoint devices comprises identifying the first subset of endpoint devices and identifying the second subset of endpoint devices based on the set of endpoint device containers, published by the first security technology and the security technology during the first time interval, in response to conclusion of the first time interval.

12. The method of claim 1, wherein identifying the second subset of endpoint devices comprises:
retrieving a first endpoint device container associated with the first security technology;
calculating a set of correspondence scores for the first endpoint device container and a target subset of endpoint device containers, in the set of endpoint device containers, associated with the second security technology based on:
similarities of fixed identifying data stored in the first endpoint device container and the target subset of endpoint device containers; and
similarities of concurrent variable status data stored in the first endpoint device container and the target subset of endpoint device containers; and
in response to the set of correspondence scores falling below a threshold correspondence score, identifying the first endpoint device container as corresponding to a first endpoint device, in the second subset of endpoint devices, configured with the first security technology and excluding the second security technology.

13. The method of claim 1:
wherein generating the set of endpoint device containers comprises polling objects from the set of security technologies during the first time interval at a first polling frequency; and
further comprising:
setting a second polling frequency for a second time interval, succeeding the first time interval, greater than the first polling frequency based on a quantity of endpoint devices in the second subset of endpoint devices; and
generating a second set of endpoint device containers based on objects polled from the set of security technologies during the second time interval at the second polling frequency.

14. The method of claim 1:
wherein identifying the first subset of endpoint devices comprises identifying the first subset of endpoint devices configured with the first security technology in a first configuration and the second security technology in a target configuration based on correspondence between fixed identifying data and variable status data contained in the first subset of endpoint device containers;
further comprising identifying a third subset of endpoint devices, in the set of endpoint devices, configured with the first security technology in a second configuration and the second security technology in the target configuration based on correspondence between fixed identifying data and variable status data contained in the third subset of endpoint device containers associated with the first security technology and the second security technology; and
further comprising, in response to the security policy specifying deployment of the first security technology in the first configuration and the second security technology in the target configuration:
generating a second prompt to selectively investigate endpoint devices, in the third subset of endpoint devices, for improper configuration of the first security technology; and
serving the second prompt to security personnel affiliated with the computer network.

15. A method comprising:
accessing a set of event logs published by a set of security technologies designated for deployment on a computer network;
for each event log in the set of event logs, generating a set of endpoint device containers for each security technology in the set of security technologies, each endpoint device container comprising fixed identifying data representing an endpoint device;
based on identifying data and event-based identifying data contained in endpoint device containers in the set of endpoint device containers associated with the set of security technologies:
generating a manifest of endpoint devices connected to the computer network during the first time interval; and
labeling each endpoint device in the manifest of endpoint devices with a combination of security technologies, in the set of security technologies, deployed on the set of endpoint devices during the first time interval; and
at an operator portal:
receiving selection of a subset of security technologies, in the set of security technologies; and
rendering a visualization depicting quantities of endpoint devices labeled with permutations of the subset of security technologies in the manifest.

16. The method of claim 15, wherein rendering a visualization depicting quantities of endpoint devices labeled with permutations of the subset of security technologies in the manifest further comprises:
generating a visualization representing:
a first subset of endpoint devices configured with a first security technology and a second security technology of the set of security technologies; and
a second subset of endpoint devices configured with the first security technology and excluding the second security technology of the set of security technologies.

17. The method of claim 16, wherein generating the visualization further comprises:
initializing the visualization comprising:
a first area corresponding to the first security technology; and
a second area corresponding to the second security technology and partially intersecting the first area;
annotating a first intersection of the first area and the second area with a first quantity of endpoint devices in the first subset of endpoint devices; and
annotating the first area, outside of the second area, with a second quantity of endpoint devices in the second subset of endpoint devices.

18. A method for monitoring a set of security technologies deployed within a set of endpoint devices affiliated with a computer network, the method comprising:
generating a set of endpoint device containers for each security technology in the set of security technologies, each endpoint device container comprising fixed identifying data and variable status data representing an endpoint device;

identifying a first subset of endpoint devices, in the set of endpoint devices, configured with a first security technology and a second security technology in the set of security technologies based on correspondence between fixed identifying data and variable status data contained in a first subset of endpoint device containers associated with the first security technology and the second security technology;

identifying a second subset of endpoint devices, in the set of endpoint devices, configured with the first security technology and excluding the second security technology based on absence of correspondence between fixed identifying data and variable status data contained in a second subset of endpoint device containers associated with the first security technology and the second security technology; and in response to selection of the first security technology and the second security technology at an operator portal:
- initializing a visualization comprising:
  - a first area corresponding to the first security technology; and
  - a second area corresponding to the second security technology and partially intersecting the first area;
- annotating a first intersection of the first area and the second area with a first quantity of endpoint devices in the first subset of endpoint devices; and
- annotating the first area, outside of the second area, with a second quantity of endpoint devices in the second subset of endpoint devices.

19. The method of claim 18, wherein identifying the first subset of endpoint devices comprises:
  retrieving a first endpoint device container associated with the first security technology;
  retrieving a second endpoint device container associated with the second security technology;
  calculating a first correspondence score for the first endpoint device container and the second endpoint device container based on:
    similarities of fixed identifying data stored in the first endpoint device container and the second endpoint device container; and
    similarities of concurrent variable status data stored in the first endpoint device container and the second endpoint device container; and
  in response to the first correspondence score exceeding a threshold correspondence score:
    identifying the first endpoint device container and the second endpoint device container as corresponding to a first endpoint device, in the first subset of endpoint devices, configured with the first security technology and the second security technology; and
    compiling fixed identifying data and variable status data contained in the first endpoint device container and the second endpoint device container into a first representation of the first endpoint device during the first time interval.

20. The method of claim 19 further comprising:
linking the first intersection to identifiers of the first subset of endpoint devices;
linking the first area, outside of the second area, to identifiers of the second subset of endpoint devices;
in response to selection of the first intersection, rendering a first list of identifiers of the first subset of endpoint devices within an operator portal; and
in response to selection of a first identifier from the first list of identifiers of the first subset of endpoint devices, presenting the first representation of the first endpoint device during the first time interval within the operator portal.

* * * * *